(12) United States Patent
Shylo et al.

(10) Patent No.: US 9,000,994 B2
(45) Date of Patent: Apr. 7, 2015

(54) MILLIMETER AND SUB-MILLIMETER WAVE RADAR-RADIOMETRIC IMAGING

(75) Inventors: Sergiy Shylo, Kharkov (UA); Yuriy Sydorenko, Kharkov (UA); Dana Wheeler, East Hampstead, NH (US); Douglas Dundonald, Argyll (GB)

(73) Assignee: Radio Physics Solutions, Ltd., Bromesberrow (GB)

( * ) Notice: Subject to any disclaimer, the term of this patent is extended or adjusted under 35 U.S.C. 154(b) by 600 days.

(21) Appl. No.: 13/227,646

(22) Filed: Sep. 8, 2011

(65) Prior Publication Data

US 2012/0062411 A1    Mar. 15, 2012

Related U.S. Application Data

(60) Provisional application No. 61/382,180, filed on Sep. 13, 2010.

(51) Int. Cl.
| | | |
|---|---|---|
| *H01Q 3/08* | (2006.01) | |
| *H01Q 3/10* | (2006.01) | |
| *G01K 11/00* | (2006.01) | |
| *G01S 13/42* | (2006.01) | |

(Continued)

(52) U.S. Cl.
CPC ............... *H01Q 3/10* (2013.01); *G01K 11/006* (2013.01); *G01S 13/422* (2013.01); *G01S 13/89* (2013.01); *H01Q 5/001* (2013.01); *H01Q 5/0013* (2013.01); *H01Q 13/28* (2013.01); *H01Q 21/068* (2013.01); *H01Q 25/00* (2013.01); *H01Q 25/002* (2013.01)

(58) Field of Classification Search
CPC ......... H01Q 3/14; H01Q 3/04; H01Q 19/062; G01K 11/006
USPC ................................. 343/760, 762, 763, 757
See application file for complete search history.

(56) References Cited

U.S. PATENT DOCUMENTS

| | | |
|---|---|---|
| 5,933,120 A | 8/1999 | Manasson et al. |
| 6,217,210 B1 | 4/2001 | Roeder et al. |

(Continued)

FOREIGN PATENT DOCUMENTS

| | | |
|---|---|---|
| UA | 56347 C2 | 5/2003 |
| UA | 85932 C2 | 6/2007 |

OTHER PUBLICATIONS

Andrenko S.D., Devyatkov N.D., Shestopalov V.P.—Antenna array of millimeter waves, Doklady Akademii nauk USSR (Proceedings of the Academy of Sciences of USSR), 1978, v. 240, No. 6, pp. 1340-1343.

(Continued)

*Primary Examiner* — Hoanganh Le
(74) *Attorney, Agent, or Firm* — Reza Mollaaghababa; Thomas J. Engellenner; Pepper Hamilton LLP

(57) ABSTRACT

An antenna is provided that is configured to implement a combined radar and radiometric imaging method. The antenna comprises: a bearing device on which is rigidly mounted: rotating waveguide adapter which provides the output for the antenna; an electromechanical drive, the output shaft of which is defined as the main axis of rotation for the antenna and a position sensor. The antenna further comprises an antenna rotor, the rotation of which is configured to be controlled by the output shaft of the electromechanical drive of the bearing device. The antenna rotor comprises: at least one 2D diffraction grating; planar dielectric waveguide connected over a diffraction field to the 2D diffraction grating; a linear waveguide turn; and a feed adapter.

22 Claims, 14 Drawing Sheets

(51) Int. Cl.
*G01S 13/89* (2006.01)
*H01Q 5/00* (2006.01)
*H01Q 13/28* (2006.01)
*H01Q 21/06* (2006.01)
*H01Q 25/00* (2006.01)

(56) References Cited

U.S. PATENT DOCUMENTS

| | | | |
|---|---|---|---|
| 8,593,157 B2 * | 11/2013 | Adams et al. | 324/642 |
| 8,633,442 B2 * | 1/2014 | Tomioka | 250/341.1 |
| 2007/0046525 A1 | 3/2007 | Holbrook et al. | |
| 2008/0129581 A1 | 6/2008 | Douglass et al. | |
| 2009/0135051 A1 | 5/2009 | Bishop et al. | |
| 2011/0103800 A1 * | 5/2011 | Shinada et al. | 398/116 |
| 2011/0298680 A1 | 12/2011 | Shylo et al. | |
| 2012/0261576 A1 * | 10/2012 | Tomioka | 250/338.1 |

OTHER PUBLICATIONS

Andrenko S.D., Evdokimov A.P., Kryzhanovskiy V.V., Provalov S.A., Sidorenko Yu.B., Skaniruyuschaya antenna samoletnogo radiometricheskogo kompleksa ("Scanning antenna of the aircraft radio physical complex"), Radiofizicheskiye metody l sredstva dlya issledovaniyaokruzhayuschey sredy v millimetrovom diapazone.: Sb.nauch. tr.—Kiev: Nauk. dumka, 1988.—s. 154-160.

Buduris J., Chenevie P. Ultra-high frequency chains (Theory and application). Translation from French./Editor A.L. Zinovieva.—M. :Sov. Radio, 1979,—288 p., pp. 129-130.

Goldsmith P.F., Huguenin G.R., Kapitzky J., Focal Plane Imaging Systems for Millimeter Wavelengths, IEEE Transactions on Microwave Theory and Techniques, vol. 41, No. 10, Oct. 1993, pp. 1664-1675.

Hersman M.S., Poe G.A. Sensitivity of the total power radiometer with periodical absolute calibration, IEEE Transactions on Microwave Theory and Techniques vol. 29, No. 1, pp. 32-40, 1981.

International Preliminary Report on Patentability, PCT/GB08/051218, dated Feb. 15, 2011.

Kuhling H. Physics. Directory, Translation from German / Under the editorship of E.M. Leykin.—M.: Mir, 1980,—4 pages.

Shestopalov V.P., Andrenko SD., Belyaev V.G., Sidorenko Yu.B., Provalov S.A. "Millimeter and Submillimeter surface electromagnetic waves transformation into volume waves and this phenomenon utilization in physics and technique", The bulletin of Ukrainian academy of sciences. No. 1, Sichen, 1977—S. 8-21.

Shilo S A et al.: "Millimeter Wave Imaging System", Physics and Engineering of Microwaves, Millimeter and Submillimeter Waves and Workshop on Terahertz Technologies, The Sixth International Kharkov Symposium on, IEEE, PI, Jun. 1, 2007, pp. 455-457, XP031129478, ISBN: 978-1-4244-1237-2.

Spravochnik po matematike dlya ingenerov i uchaschikhsya VTUZov. Bronshteyn I.N., Semendyayev K.A., M.:Nauka, (Handbook in mathematics for engineers and students. Large volume in 704 pages) 1981, pp. 233-234.

* cited by examiner

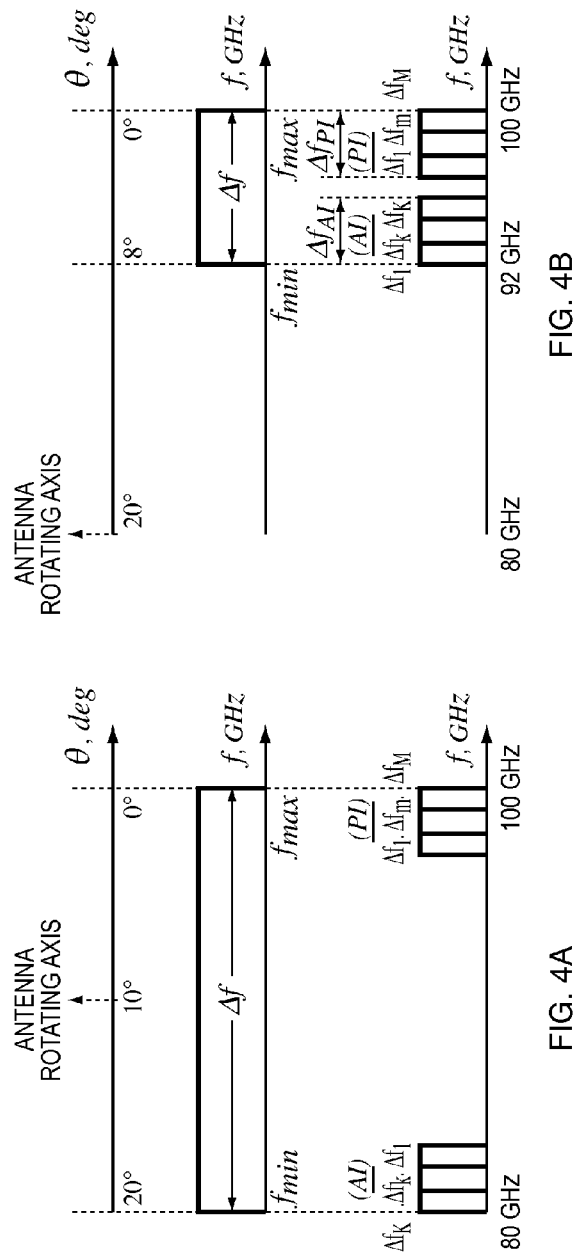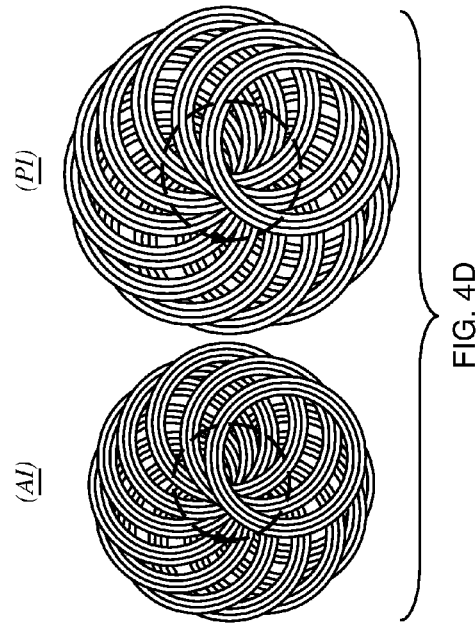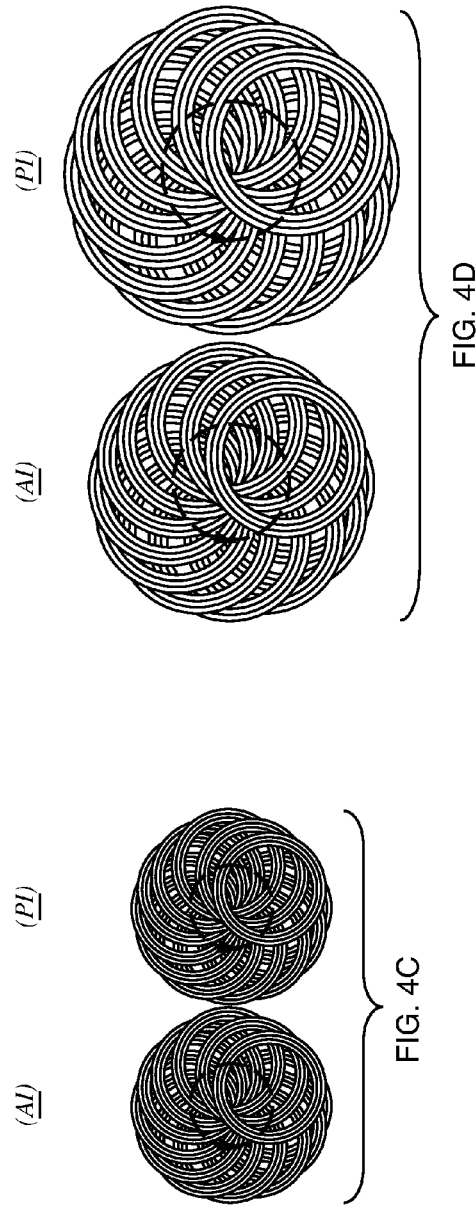
FIG. 4A
FIG. 4B
FIG. 4C
FIG. 4D

RECEIVING ANTENNA PATTERN (AI) (PI)

RECEIVING ANTENNA PATTERN (AI) (PI)

TRANSMITTING ANTENNA PATTERN

TRANSMITTING ANTENNA PATTERN

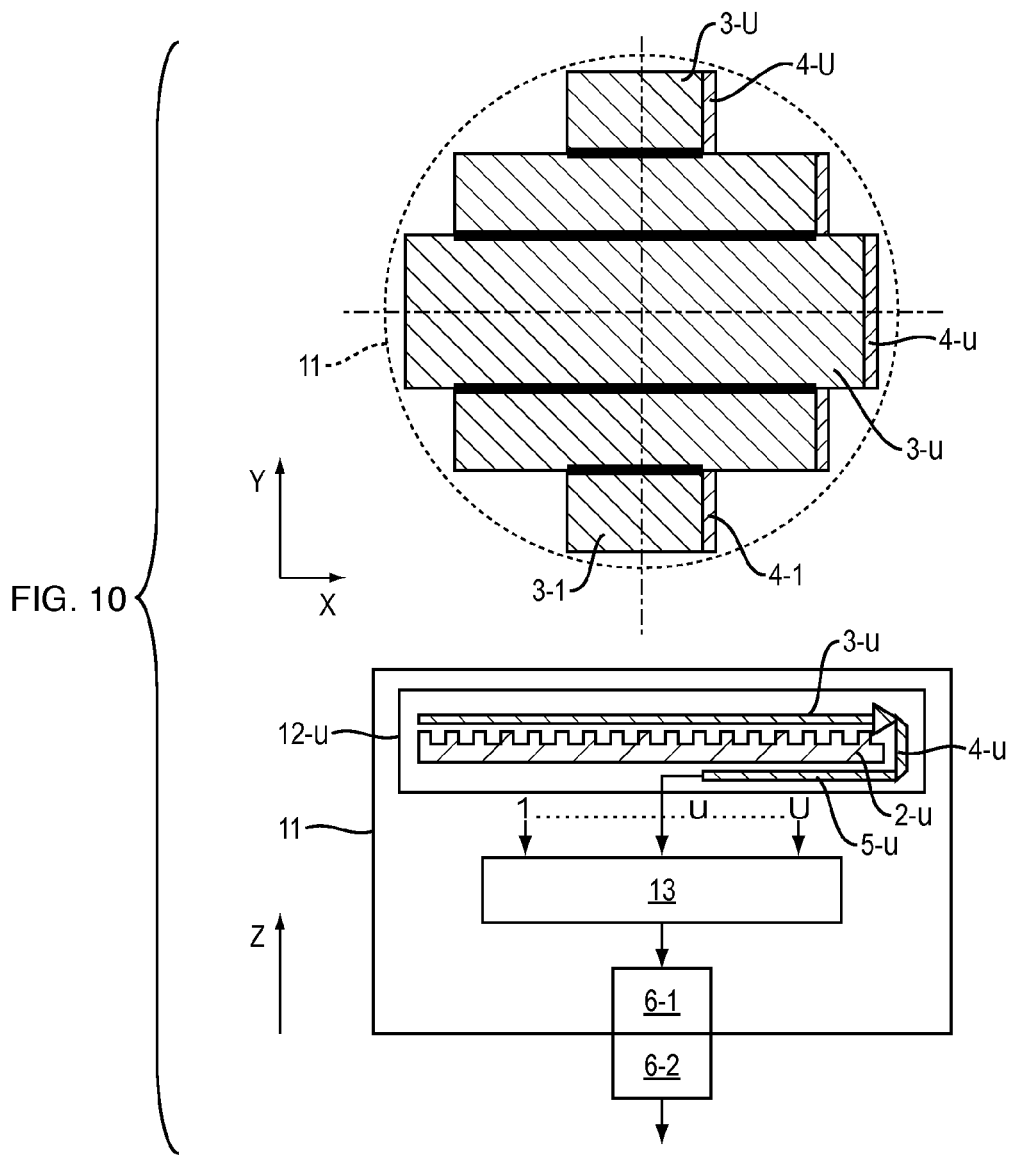

MILLIMETER AND SUB-MILLIMETER WAVE RADAR-RADIOMETRIC IMAGING

CROSS-REFERENCE TO RELATED APPLICATIONS

This application claims the benefit of priority of U.S. Provisional Patent Application No. 61/382,180, filed on Sep. 13, 2010, the entire contents of which are incorporated herein by reference. This application also claims the benefit of priority of United Kingdom Patent Application No. GB1015207.2, filed on Sep. 13, 2010, the entire contents of which are incorporated herein by reference.

FIELD

The invention relates to microwave imaging devices and is designed for the on-line millimeter or sub-millimeter wave imaging of objects, when operating in active (when emitting a microwave signal and receiving a portion of this signal reflected from the observed object) and/or passive (when receiving natural external emission) modes. The method, as well as the antenna and system implementing this method may be used, in particular, for obtaining images of a person in the course of customs control in order to detect various objects hidden on the human body under clothes, or for the sake of thermometric medical diagnostics.

BACKGROUND

Currently, remote investigations of various environments are frequently carried out using with methods implemented in the microwave waveband (both passive and active). These methods are based on dependencies between the intensity of intrinsic radio-thermal radiation of the investigating volume (in passive mode) or back scattering value (in active mode) of different objects and their physicochemical parameters.

SUMMARY

For microwave observations one of the primary tasks includes measurement and registration of spatial distributions of the intensity of received emissions/radiation produced/scattered by an object, in which case it will be most convenient to represent data of spatial distributions of non-uniformities in the form of 2D images, in which two image coordinates correspond to the spatial coordinates of the field of view and the brightness or color tone of the unit image element describe the intensity of the received emissions/radiation within the established scale of values. In this case, the higher the accuracy and spatial resolution of the system are in the course of imaging, in other words, the higher the reproduced accuracy of spatial non-uniformities (topography) of measured electromagnetic fields is, the more efficiently obtained images may be used in various applications.

Suitable applications include:
  on-line remote detection of weapons and smuggled or concealed goods on the human body under clothes on transport facilities and objects under guard, for threat-detection and use at/in security portals;
  imaging of runway and surrounding potential hazards such as mountains and high rise buildings, for use on board commercial or defense aircraft and when flying in adverse/poor weather conditions or other circumstances resulting in a lack of information in the visible spectrum;
  For use in poor visibility caused by dust and particulates such as following earthquakes and building collapse, in dusty areas such as deserts, in mining, transport convoys of vehicles, tanks and the like or during stand-off situations where visibility is affected by smoke or gas;
  obtaining contrast images of the seat of forest and/or landscape fires from on board aircraft under conditions of acute smoke generation to enable safe navigation and direction of fire-fighting services, both in the air and ground-based;
  imaging of the surface and/or subcutaneous structures of the human body in order to provide of non-contact medical diagnostics including imaging under medical dressings.

The advantage of millimeter and sub-millimeter radio wave imaging systems lies in high spatial resolution achieved using comparably small antenna sizes. In this case, within the short-wave part of the millimeter wave band and within the long-wave part of the sub-millimeter wave band, images may be formed, which in terms of their quality are only insignificantly worse than those obtained within the optical and infrared spectral bands. At the same time, such images allow obtaining data of object parameters at a certain depth, which is unachievable for more high-frequency bands of electromagnetic spectrum. Joint use of active and passive sensors allowing simultaneous formation of images of the same space area considerably enhances capabilities of remote sensing methods and increase possibilities of detection of non-uniformities and their identification.

At the same time, existing technical limitations prevent from full-measure implementation of potentials of such systems. Such limitations may include possibility of operation in either active or passive imaging mode, complexity and high cost of systems, comparably small coverage sectors and low imaging speeds, which in some cases may be insufficient for resolving practical tasks.

In existing microwave imaging systems, the preset field of view in case of active and/or passive sensing is periodically observed in the course of imaging:
  either by single needle-like beam of the directional pattern of receiving antenna, when controlled by two spatial coordinates (scanning) (see, for example, Goldsmith P. F., Huguenin G. R., Kapitzky J.—Focal Plane Imaging Systems for Millimeter Wavelengths//IEEE Transactions on Microwave Theory and Techniques, v. MTT-41, No. 10, October 1985, pp. 1664-1675);
  or by using a multi-beam directional pattern formed with the help of a beam-forming matrix of receivers located in the focal plane of the receiving antenna—absent scanning or for combined multi-beam scanning is utilized (see, for example, Goldsmith P. F., Huguenin G. R., Kapitzky J.—Focal Plane Imaging Systems for Millimeter Wavelengths//IEEE Transactions on Microwave Theory and Techniques, v. MTT-41, No. 10, October 1985, pp. 1664-1675);
  or by using a multi-beam directional pattern formed due to the frequency separation of receiving directions when scanning such directional pattern by one of the coordinates (US2009/0135051 A1, 3 Oct. 2008, Mobile Millimeter Wave Imaging Radar System; UA 85932 C2, 19 Jun. 2007, Thermal Radio Imaging Method and Antenna for Its Implementation).

The disadvantages of systems with beam-forming matrixes within the millimeter and sub-millimeter wave band include the difficulty of positioning of a large number of feed elements (measuring channels) in the focal plane of the antenna when physically limited dimensions of a unit feed element are presented, problematic building of beam-forming matrixes with spatially overlapping beams in implementing highly directional antennas, as well as the high total cost of the systems, connected with the increasing number of reception channels in quadratic dependence $B^2$ on the number of image elements B for each of the coordinates. In this case, each of the mentioned channels should contain a full set of elements intrinsic to microwave receiver.

There are also imaging methods combining the features of the beam-forming matrix method and principles of sequential spatial reorientation of the group directional pattern created by a beam-forming matrix. In this case, the number of receivers in the system may be reduced to a technically and economically acceptable value. However technical problems arise, connected with the necessity of quick reorientation of positions of the group directional diagram within the sector of viewing angles.

The disadvantages of the imaging scheme with a single beam of the directional pattern and in the case of reciprocal movement of the directional pattern (line-frame scanning principle) include low imaging speed and strict requirements imposed on speed parameters of the mechanical antenna orientation device.

One of imaging methods having no sign-variable mechanical moments in scanning the directional diagram is the method with circular rotation of the directional diagram around the axis misaligned with the antenna beam axis (US2007/0046525 A1, 14 Feb. 2006, Electromagnetic Scanning Imager), in which the circular (elliptical) beam travel trace in the observed object plane is formed due to circular rotation of a focusing lens of which the axis is misaligned with the axis of rotation. Such imaging method, system and antenna may be used to create both radar and radiometric images. The advantage of the method includes a potentially high rotating motion speed of the beam in the case of single-beam scanning, allowing formation of images without time expenditure for the beam moving into its initial position. At the same time, such imaging method has some limitations, as it is based on the quasi-optical antenna construction scheme and may be only effectively applied in the short-wave part of the millimeter and sub-millimeter wave bands, when a highly directional beam can be formed under comparably small dimensions and weight of the antenna module. In addition, the single-beam directional pattern allows forming an image with a comparably low image frequency, which will decrease with the increasing directivity of the antenna beam (i.e. with the increasing spatial resolution). These features limit the capabilities of the said imaging method when used for creating images with a high spatial resolution and high image update frequency.

In the course of radar imaging, one possible method for organizing additional illumination of the observed space area using an auxiliary emission source includes use of two highly directional antennas both of which are configured to be capable of both transmitting and receiving. The two antennae operate in a mode of complete or partial overlapping of beam traces in scanning by single-beam or multi-beam directional patterns. An example of such radar imaging system includes the system described in US2009/0135051 A1, 3 Oct. 2008, Mobile Millimeter Wave Imaging Radar System. In this system, space observation is carried out synchronously by multi-beam directional patterns of the transmitting and receiving antennae, in which case the multi-beam directional patterns are formed due to the frequency separation of receiving directions in the transmitting and receiving parabolic antennae with linear scan feeds, which represents the advantage of this technical solution, as the imaging is carried out using only one microwave receiving device. The disadvantage of the system lies in the reciprocal antenna motion principle in the course of scanning, which limits the imaging speed. Another disadvantage includes the limited sector of viewing angles, connected with the operating frequency bandwidth. A further disadvantage of the system is that the information that can be gleaned from the system is limited by, for example, the operation in only one (active) mode thereby limiting the ability to detect objects with complex and variable signal signatures that arise as a result of the changing viewing angle or are dependent from/on viewing angle.

One known imaging methods in radio-wave imaging systems includes application of scanning antennas based on the surface-to-volume wave transformation effects in open electrodynamic structures which were for the first time studied more than 30 years ago (Andrenko S. D., Devyatkov N. D., Shestopalov V. P.—Millimeter Wave Antenna Arrays//Reports of the Academy of Sciences of the USSR, 1978, Volume 240, No. 6, pp. 1340-1343; Shestopalov V. P., Andrenko S. D., Beliayev V. G., Sidorenko Yu. B., Provalov S. A.—Surface-to-Volume Transformation of Millimeter and Sub-Millimeter Electromagnetic Waves and Using This Phenomenon in Physics and Engineering//Scientific Reviews and Communications, Bulletin of the Academy of Sciences of the Ukrainian SSR, No. 1, January 1977, pp. 8-21). Such antennas usually include a linear or planar dielectric waveguide and a scattering diffraction grating which is positioned in the immediate vicinity thereof, as well as elements ensuring concentration of electromagnetic energy and its transmission to the receiver input.

Using dispersion properties of such open electrodynamic structures enables to form multi-beam directional diagrams of antennas and control the spatial orientation of these diagrams due to synchronous modification of parameters of the electrodynamic system of antennas, ensuring space observation within a predetermined sector of spatial angles.

For example, such multi-beam observation scheme may be implemented based on the circular scanning law (Patent (UA) 85932 C2, 19 Jun. 2007, Thermal Radio Imaging Method and Antenna for Its Implementation).

In this case, division of the overall received frequency band into M independent frequency channels (M≥1) and parallel processing of signal received by the antenna within each of M frequency channels in the radiometric imaging mode enables obtaining M signals, of which the amplitude at each specific point of time in temperature scale units corresponds to current intensity values of the emission received by the antenna in each of M frequency bands, and at the same time corresponds to current spatial positions of M antenna beams.

The above-mentioned antenna contains a bearing device, electromechanical drive, rotating waveguide adapter, angular momentum compensator, planar dielectric waveguide and 2D diffraction grating, feed-adapter, as well as a position sensor, where the planar dielectric waveguide and 2D diffraction grating are electrodynamically connected with each other over the diffraction field within the antenna operating frequency band, in which case in dividing this frequency band into narrower bands, a fan-shaped multi-beam directional diagram is formed within the space, while the side of the planar dielectric waveguide on which the received emission falls acts as a receiving aperture plane, and the planar dielectric waveguide, 2D diffraction grating and feed-adapter are mechanically rigidly connected with each other and form a single structural assembly called as antenna rotor, which antenna rotor is mechanically rigidly connected with the output shaft of the electromechanical drive, where the position sensor is linked to the antenna rotor, and the informative parameter of the output signal of the position sensor is bounded by the angular position of the antenna rotor when rotating around the axis of rotation.

One object of the invention relates to improvement of the radar-radiometric imaging method due to the transition from the group reciprocal linear motion to uniform unidirectional circular motion of the antenna multi-beam directional diagram in case of frequency division of channels of the radar and radiometric systems, which will ensure simultaneous use of the antenna for radar and radiometric imaging, increase of the limit imaging speed and increasing the sector of viewing angles.

A further object of the invention relates to improvement of the scanning antenna due to the implementation, in case of the circular scanning principle, of two beam groups independently used to form radar and radiometric images, which will ensure improved scanning speed, extended sector of viewing angles and reduced production cost of the system.

A further object of the invention relates to improvement of the millimeter and sub-millimeter wave radar-radiometric imaging system by using a highly directional multi-beam scanning antenna with circular scanning, or two identical highly directional multi-beam scanning antennas with circular scanning, or one highly directional multi-beam scanning antenna with circular scanning and one weakly directional antenna with circular rotation, or one highly directional multi-beam scanning antenna with circular scanning and two weakly directional antennas with circular rotation, in order to simultaneously form radar and radiometric images with the aim to increase imaging speed and extend the sector of viewing angles, as well as in order to improve the information content of the system as a result of the joint processing of radar and radiometric images.

According to the present invention there is provided a radar-radiometric imaging method consisting in cyclically exercised observation, with a time period T of a selected space section due to antenna beam rotation with a period $T_a$ ($T_a \leq T$) around a rotation axis misaligned with this beam axis, along with the simultaneous change of the spatial orientation of this rotation axis using an antenna positioning device according to the law ensuring survey of the selected space domain for the time T without gaps, as well as in irradiation of the observed space element using an emission source, in reception of a portion of the emitted signal reflected from the space element selected by the antenna beam, in representation of the received signal in the form of time sequence of counts with the total number of the counts N (N≥1), where the independent count number n (N≥n≥1), $n=t_n/\Delta t$ in the sequence is determined by the time interval $t_n$ (T≥$t_n$≥0) elapsed from the time of beginning of formation of the successive image and time $\Delta t$ spent in the course of the antenna rotation for transition of the beam from one independent state to another, in which case during the period T the value n based on data received from the positioning device at time points $t_n$ is uniquely connected with the current spatial position of the survey direction ($\theta_n,\phi_n$) and with the selected law of variation of the spatial orientation of the antenna rotation axis ($\Theta_{an}$, $\Phi_{an}$), represented in the orthogonal angular coordinate basis ($\Theta,\Phi$), and the value of each count is connected with the level of the signal received at the same time points $t_n$, also consisting in building a 2D image, of which each element brightness is connected with the value of the respective count n in the time sequence $t_n$, and of which spatial coordinates of elements are determined based on count numbers n in the time sequence, where in forming images for counts with the coincident spatial coordinates in the interval T operation of averaging the values taken from the sequence $t_n$ for each of the independent spatial coordinate values will be carried out, according to the invention, either simultaneously during the interval T or successively during the interval 2T two images are formed, radar (AI) and radiometric (PI), for which several sequences of time counts are formed at the same time, $(AI)t_{nk}$, (K≥k≥1), (K≥1) and $(PI)t_{nm}$, (M≥m≥1), (M≥1) respectively, in which case each sequence corresponds to a separately created antenna beam, where K antenna beams participate in the radar imaging (AI) and M antenna beams participate in the radiometric imaging (PI), and survey directions for each of the beams are represented in the orthogonal angular coordinate basis ($\Theta,\Phi$) and at the time points $t_n$ are described by the coordinates, $(AI)(\theta_{kn},\phi_{kn})$ and $(PI)(\theta_{mn}, \phi_{mn})$ respectively, counted from the spatial vector $r_n$ determining the spatial orientation of the antenna aperture plane at the time points $t_n$, in which case the survey directions $(AI)\phi_{kn}$ and $(PI)\phi_{mn}$ for all antenna beams at any time point $t_n$ are the same, but the survey directions $(AI)\theta_{kn}$ for K beams for the radar image at any time point $t_n$ differ from each other, and the directions $(PI)\theta_{mn}$ for M beams for the radiometric image at any time point $t_n$ differ from each other, in which case the directions $(AI)\theta_{kn}$ and $(PI)\theta_{mn}$ are generated in an antenna with dispersion properties due to frequency division of reception directions by the spatial coordinate $\Theta$, respectively into K and M independent directions by way of segregation from the overall frequency band $\Delta f$ of the antenna of the narrower frequency bands, $(AI)\Delta f_k$ and $(PI)\Delta f_m$ respectively, each of which defines a separate reception channel, respectively, with number k in the radar part of the system and with number m in the radiometric part of the system, where in the course of imaging, position of the polarization vector of the transmitted and received emission for each of the survey directions $(AI)(\theta_{kn},\phi_{kn})$, $(PI)(\theta_{mn}, \phi_{mn})$ will change its orientation synchronously for all beams according to the cyclic law with the antenna rotation period $T_a$, where sequences of time counts $(AI)t_{nk}$ at the time interval $T_a$, will be used to form a radar image (AI), while sequences $(PI)t_{nm}$ at the time interval T will be used to form a radiometric image (PI), and, in addition, both count sequences $(AI)t_{nk}$ and $(PI)t_{nk}$, will be used, if necessary, to form a combined composite image for which the brightness and/or color of each of the image elements are/is determined based on a decision rule in the course of additional calculations carried out with count values for the same spatial elements taken from the radar (AI) and radiometric (PI) images.

The radar and radiometric imaging method of the present invention will improve the information content and imaging speed as a result of the fulfillment of the following conditions.
1) Simultaneous formation of radar and radiometric images of the same space area allows obtaining additional information, because within the microwave range, object properties—reflection (scattering) factor for radar signal and emission (emissivity) factor for radiometric signal are substantially different for different types of surface and substance, which will allow identifying the observed objects based on the joint analysis of the obtained radar and radiometric data.
2) Synchronous change, in the course of imaging, of the spatial orientation of the polarization vector of received emission for radar and radiometric signals will allow obtaining additional information due to the fact that independently for radar and radiometric images within the same imaging cycle for most elements of such images the average signals will be calculated, obtained for different spatial positions of the polarization vector, which will enable, to some extent, to eliminate uncertainties in interpreting data connected with the polarization dependence of the radar signal and intrinsic radio-thermal radiation (radiometric signal) for various natural and artificial objects.

3) In creating K beams within the radar system and M beams within the radiometric system, the imaging frequency may be K and M times improved respectively, because after each antenna revolution around its rotation axis, data will be obtained for K and M circular beam traces respectively.

The position of overall frequency band of the radar image $\Delta f_{AI}$ and position of overall frequency band of the radiometric image $\Delta f_{PI}$ may be altered inside the operating frequency band $\Delta f$ in the course of active and passive images formation consistently with changes at the antenna rotation period $T_a$. In one configuration this methodology results in the product of two images of differing diameters at opposite sides of the rotational axis. This can be used to increase the overall observational sector, whilst simultaneously providing increased sensitivity over a part of the area swept. This combination of differing image diameters is particularly advantageous when the method is deployed in volatile environments.

Furthermore according to the present invention there is provided a first example in which the antenna contains a bearing device, planar dielectric waveguide and 2D diffraction grating, feed-adapter, rotating waveguide adapter, electromechanical drive, angular momentum compensator and position sensor, where the electromechanical drive, angular momentum compensator, position sensor and rotating waveguide adapter are installed on the bearing device, the output shaft of the electromechanical drive defines the main axis of rotation, the rotation axes of the angular momentum compensator and rotating waveguide adapter coincide with the main axis of rotation, the angular momentum compensator is connected, via a kinematic scheme, with the output shaft of the electromechanical drive, the planar dielectric waveguide and 2D diffraction grating are connected via the diffraction field, the side of the planar dielectric waveguide on which the received emission falls acts as a receiving aperture plane, the input of the electromechanical drive and the output of the position sensor act as the control input and output of the antenna respectively, the output of the feed-adapter is connected to the rotating input of the rotating waveguide adapter, of which the fixed output acts as the antenna output, the angular momentum compensator has the rotation direction opposite to that of the antenna rotor, which is distinctive due to the case that it is additionally furnished with a linear waveguide turn and positioning device, where the output and input of the linear waveguide turn are connected to the output of the planar dielectric waveguide and the input of the feed-adapter respectively, the planar dielectric waveguide, 2D diffraction grating, linear waveguide turn and feed-adapter are rigidly mechanically connected with each other and form a single structural assembly called the antenna rotor, where the said antenna rotor is rigidly mechanically connected with the output shaft of the electromechanical drive, in which case the position sensor is connected with the antenna rotor, the informative parameter of the output signal of the position sensor is linked to the angular position of the antenna rotor when rotating around the main axis, and the bearing device is mechanically connected with the positioning device, where the positioning device changes, by way of repositioning of the bearing device, the spatial position of the main axis of rotation according to the preset law and at each arbitrary time point $t_n$ counted from the time of beginning of its successive operating cycle with the duration of T ($T \geq t_n \geq 0$), ($N \geq n \geq 1$) $n=t_n/\Delta t$ and for the time interval $\Delta t$ spent in the course of rotation of the antenna for the beam transition from one independent position to another, forms at its information output data of the spatial orientation of the antenna axis of rotation ($\Theta_{an}, \Phi_{an}$), represented in orthogonal angular coordinate basis ($\Theta, \Phi$).

Furthermore, according to the present invention there is provided a second example in which the antenna containing a bearing device, electromechanical drive, angular momentum compensator and position sensor, where the electromechanical drive, angular momentum compensator, position sensor and rotating waveguide adapter are installed on the bearing device, the output shaft of the electromechanical drive defines the main axis of rotation, the rotation axes of the angular momentum compensator and rotating waveguide adapter coincide with the main axis of rotation, the angular momentum compensator is connected, via a kinematic scheme, with the output shaft of the electromechanical drive, the input of the electromechanical drive and the output of the position sensor act as the control input and output of the antenna respectively, the fixed output of the rotating waveguide adapter acts as the antenna output, the angular momentum compensator has the rotation direction opposite to that of the antenna rotor, according to the invention is additionally furnished with U ($U \geq 2$) antenna elements and a phasing unit with U inputs and one output, where each antenna element with number u ($1 \leq u \leq U$) consists of a diffraction grating and connected in series planar dielectric waveguide, linear waveguide turn and feed-adapter of which the output acts as the output of the respective antenna element, in which case for each of u antenna elements, the planar dielectric waveguide and 2D diffraction grating are connected over the diffraction field, and the side of the planar dielectric waveguide on which the received emission falls acts as an aperture plane of the respective antenna element, besides in each antenna element, the planar dielectric waveguide, 2D diffraction grating, linear waveguide turn and feed-adapter are rigidly mechanically connected with each other, and where the outputs of U antenna elements are connected to U inputs of the phasing unit, U antenna elements and the phasing unit are rigidly mechanically connected with each other and form a single structural assembly called the antenna rotor, where the said antenna rotor is rigidly mechanically connected with the output shaft of the electromechanical drive, in which case the position sensor is connected with the antenna rotor, the informative parameter of the output signal of the position sensor is linked to the angular position of the antenna rotor when rotating around the main axis, and the output of the phasing unit is connected to the rotating input of the rotating waveguide adapter, where the bearing device is mechanically connected with the positioning device, and the positioning device changes, by way of repositioning of the bearing device, the spatial position of the main axis of rotation according to the preset law and at each arbitrary time point $t_n$ counted from the time of beginning of its successive operating cycle with the duration of T ($T \geq t_n \geq 0$), ($N \geq n \geq 1$) $n=t_n/\Delta t$ and for the time interval $\Delta t$ spent in the course of rotation of the antenna for the beam transition from one independent position to another, forms at its information output data of the spatial orientation of the antenna axis of rotation ($\Theta_{an}, \Phi_{an}$), represented in orthogonal angular coordinate basis ($\Theta, \Phi$).

The above mentioned examples of the present invention will enable improvements in the spatial resolution and scanning speed of the antenna as well as reducing the cost of the antenna in the course of its production owing to fulfillment of the following conditions:

1) Implementation of the linear waveguide turn will allow reducing the antenna overall dimensions for its first and second embodiment options, which will enable to implement a larger square area of the receiving aperture for lesser dimensions and weight of the antenna rotor, i.e. to obtain higher spatial resolution for lower weight and size characteristics of the antenna, and at this expense to increase the scanning speed, to decrease the drive power and to reduce the antenna production cost.

2) Creation of the antenna according to the second embodiment option based on separate antenna modules with a planar design, united using a phasing unit, will allow using, to the maximum possible extent, the square area of the rotating structure to form the antenna aperture for preset overall dimensions of the antenna rotor, which will enable to implement higher spatial resolution for lower weight and size characteristics of the antenna, and at this expense to increase the scanning speed, to decrease the drive power and to reduce the antenna production cost.

Furthermore, according to the present invention there is provided in a first example a millimeter and sub-millimeter wave radar-radiometric imaging system containing an antenna, radiometric receiver, transceiver, data collection device and imaging device connected via a bidirectional communication line, as well as an antenna drive control device, characterized in that the system is additionally furnished with a diplexer, in which case the input, the first and second outputs of the diplexer are connected to the antenna output, radiometric receiver input and transceiver input respectively, the radiometric receiver output is connected, via a bidirectional multi-channel communication line, to the first input of the data collection device, and the output and control input of the transceiver are connected to the second input and first control output of the data control device respectively, the control input and output of the antenna are connected to the control output and input of the antenna drive control device respectively, of which the output is connected to the control input of the data collection device, while the output of the antenna positioning device is connected to the third input of the data collection device.

Furthermore, according to the present invention there is provided in a second example a millimeter and sub-millimeter wave radar-radiometric imaging system containing an antenna, radiometric receiver, transceiver, data acquisition or collection device and imaging device connected via a bidirectional communication line, as well as an antenna drive control device, characterized in that the system is additionally furnished with a diplexer, in which case the input, the first and second outputs of the diplexer are connected to the receiving output of the antenna, radiometric receiver input and transceiver input respectively, the radiometric receiver output is connected, via a bidirectional multi-channel communication line, to the first input of the data collection device, the microwave output of the transceiver is connected to the transmitting output of the antenna, the output and control input of the transceiver are connected to the second input and first control output of the data control or collection device respectively, the control input and output of the antenna are connected to the control output and input of the antenna drive control device respectively, of which the output is connected to the control input of the data collection device, while the output of the antenna positioning device is connected to the third input of the data collection device.

Furthermore, according to the present invention there is provided in a third example a millimeter and sub-millimeter wave radar-radiometric imaging system containing an antenna, radiometric receiver, transceiver, data collection device and imaging device connected via a bidirectional data communication line, as well as an antenna drive control device, characterized in that the system is additionally furnished with a diplexer and switching unit, in which case the input, the first and second outputs of the diplexer are connected to the receiving output of the antenna, radiometric receiver input and transceiver input respectively, the radiometric receiver output is connected, via a bidirectional multi-channel communication line, to the first input of the data collection device, the microwave output of the transceiver is connected with the input of the switching unit, of which the first and second outputs are connected to the first and second transmitting outputs of the antenna respectively, the output and control input of the transceiver are connected to the second input and first control output of the data control or collection device respectively, the control input and output of the antenna are connected to the control output and input of the antenna drive control device respectively, of which the output is connected to the control input of the data collection device, while the output of the antenna positioning device is connected with the third input of the data collection device, and the control input of the switching unit is connected to the second control output of the data collection device.

The third example of the millimeter and sub-millimeter wave radar-radiometric imaging system will allow simultaneous creation of radar and radiometric images with a high display updating rate and extended sector of viewing angles due to fulfillment of the following conditions:

1) Using a circular scanning antenna with a multi-beam directional pattern in which either the same or separate beam groups are used for the purpose of radar and radiometric imaging will allow to ensure simultaneous creation of radar and radiometric images within a wide range of viewing angles and with a high space survey speed.
2) Simultaneous generation of radar and radiometric images will improve information content of the system, as due to different physical mechanisms of formation of scattered radar and emitted radiometric signals within the millimeter and sub-millimeter wavebands, because of joint processing of radar and radiometric images, it will be possible to reduce the non-uniqueness of interpretation of the obtained data for multiple natural and artificial objects observed.

BRIEF DESCRIPTION OF THE DRAWINGS

In order to explain the invention, below is the specific example of its implementation with the reference to drawings attached.

FIG. 4A shows an example of the location of frequency bands for symmetric location of the antenna beams participating in the radar and radiometric imaging.

FIG. 4B shows an example of the location of frequency bands for asymmetric location of the antenna beams participating in the radar and radiometric imaging.

FIG. 4C shows an example of imaging schemes for symmetric location of the antenna beams participating in the radar and radiometric imaging.

FIG. 4D shows an example of imaging schemes for asymmetric location of the antenna beams participating in the radar and radiometric imaging.

FIG. 10 provides the structure of the antenna rotor of the second example of the present invention when combining separate antenna elements into a phased array.

DETAILED DESCRIPTION

Figure 1A:
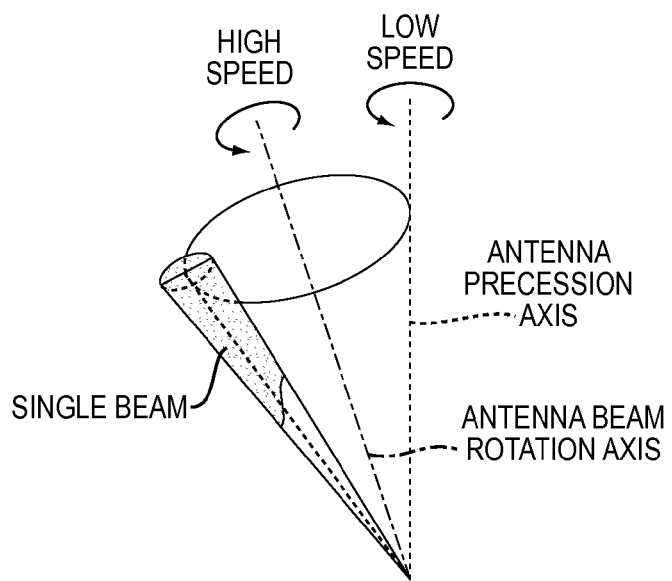
FIG. 1A provides a conventional representation of the basic option of the spatial imaging diagram, explaining the imaging method of the present invention.
Figure 1B:
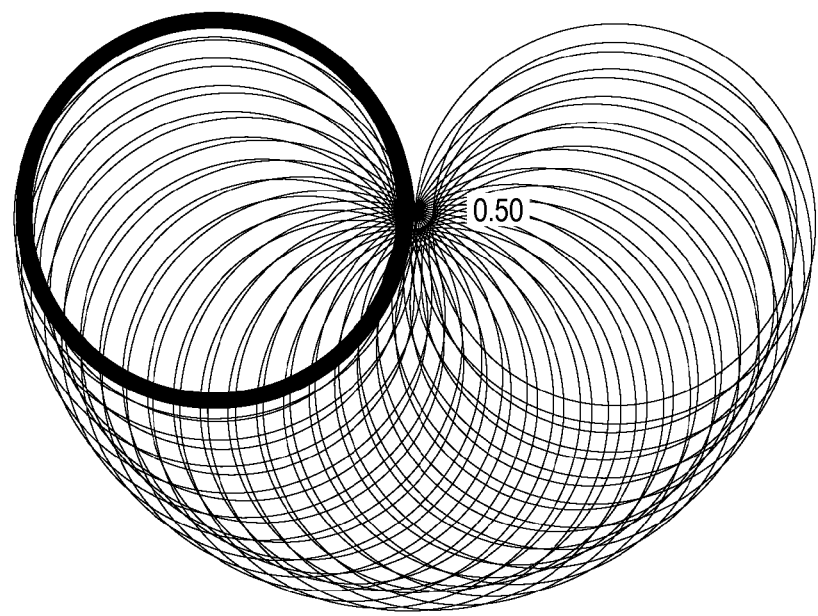
FIG. 1B provides a conventional representation of the basic option of the spatial imaging diagram, explaining the imaging method of the present invention.
Figure 2:
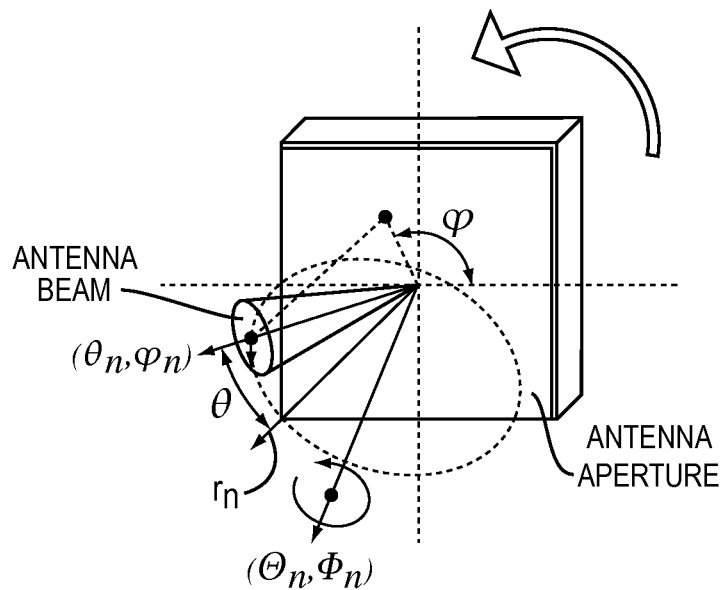
FIG. 2 provides schematic representation of the antenna beam travel diagram within the spatial coordinate system.
Figure 3:
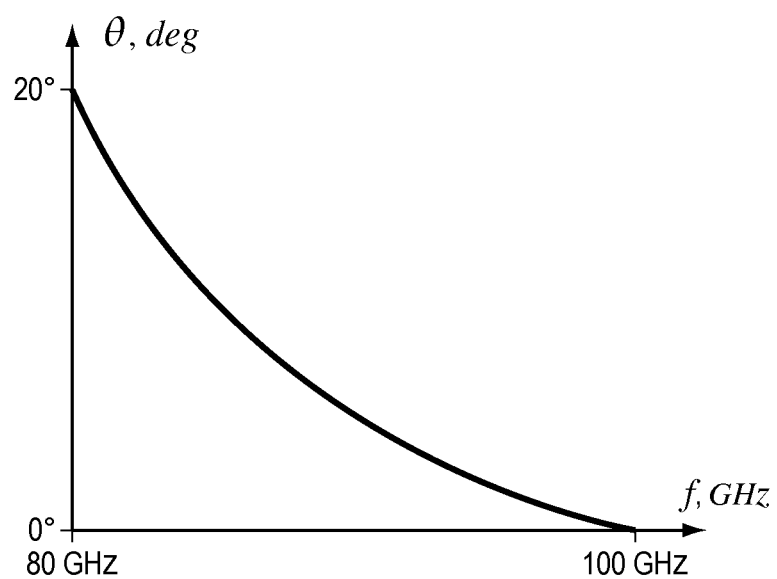
FIG. 3 shows the dispersion characteristic of the planar antenna for the frequency-dependent survey direction.
Figure 5:
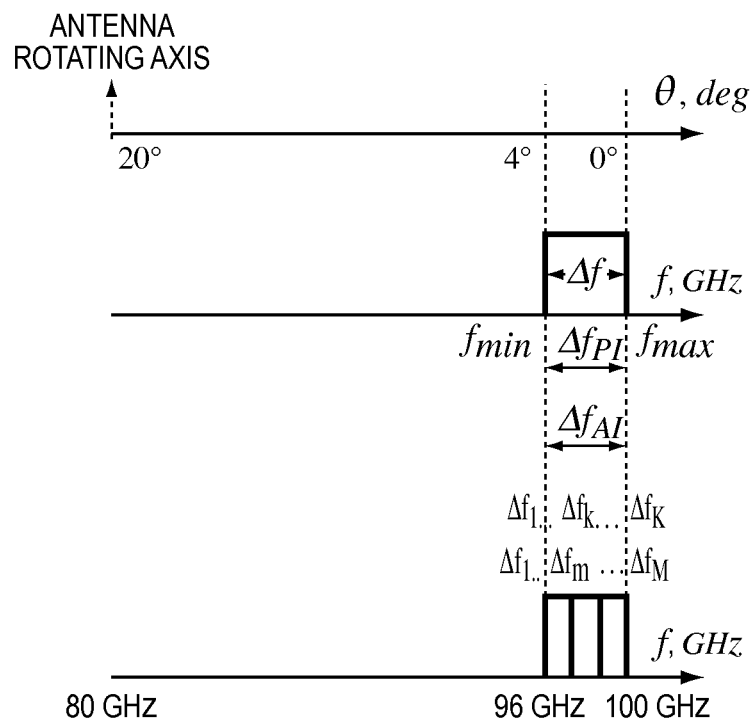
FIG. 5 shows the example of the location of frequency bands for the option of illumination of the field of view using a noise emission source.
Figures 6A, 6B:
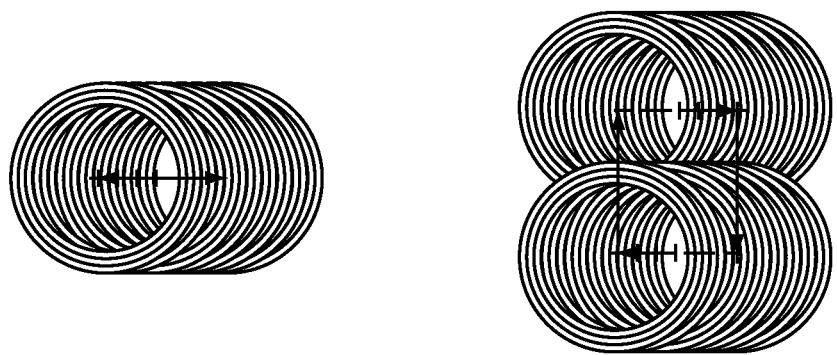
FIG. 6A shows an imaging scheme for the reciprocal law of spatial motion of the antenna axis of rotation.
FIG. 6B shows an imaging scheme for the rectangular law of spatial motion of the antenna axis of rotation.
Figure 7B:
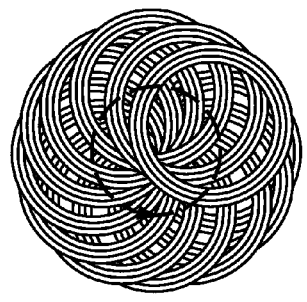
FIG. 7B provides the imaging diagram for the receiving antenna when using two identical antennas independently for transmission and reception.
Figure 8B:
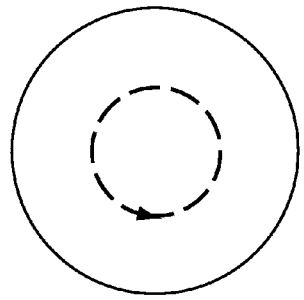
FIG. 8B provides the imaging diagram for the receiving antenna when using different antennas independently for transmission and reception.
Figure 7A:
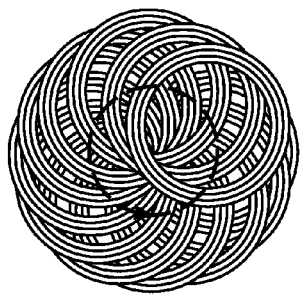
FIG. 7A provides the imaging diagram for the transmitting antenna when using two identical antennas independently for transmission and reception.
Figure 8A:
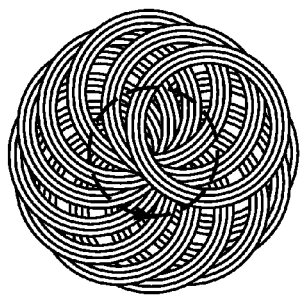
FIG. 8A provides the imaging diagram for the transmitting antenna when using different antennas independently for transmission and reception.

The submitted radar and radiometric imaging method will be implemented as follows (see FIG. 1-3, 4a,c).

A sequence of operations will be carried out cyclically in time, in the course of which either simultaneously during the interval T (for example, T=1 sec) or successively during the interval 2T two images are formed, radar (AI) and radiometric (PI), for which at the interval T survey of the selected space section is made due to rotation of the antenna beams with the period of $T_a$ ($T_a \leq T$) (for example, $T_a$=0.1 sec) around the axis of rotation misaligned with no one of its beams axes, subject to the simultaneous change of the spatial orientation of this rotation axis using an antenna positioning device according to the law ensuring survey of the selected space domain by means of the antenna beams for the time T without gaps (for example, due to precession of the antenna axis of rotation along a cone generatrix, for example, with the cone vertex angle of 10° and duration $T_p$ of the full precession equal to $T_p$=T). In this case, the observed space elements are irradiated using an emission source—pulse, noise or with variable emission frequency (for example, within the frequency band of 80-84 GHz)—and a portion of the emitted signal is received, reflected from the space elements and segregated by the antenna beams (within the same frequency band of 80-84 GHz), as well as radio-thermal radiation from the space elements selected by the antenna beams (for example, within the frequency band of 96-100 GHz) is received (for example, in the event of the spatial resolution of the antenna in terms of both coordinates for each of the beams, equal to 0.5°).

The received signals will be represented in the form of sequences of time counts, (AI)$t_{nk}$, (K≥k≥1), (K≥1) and (PI) $t_{nm}$, (M≥m≥1), (M≥1) respectively, with the number of counts in each sequence N (N≥1) (for example, N=4096), in which case the number of independent count n (N≥n≥1), n=$t_n$/Δt in each sequence is determined by the selected time interval $t_n$ (T≥$t_n$≥0) elapsed from the time of the beginning of formation of the successive image and time Δt spent in the course of rotation of the antenna for transition of the beams from one independent position to another, in which case during the period T the value n, based on data received from the positioning device at time points $t_n$, will be uniquely connected with the current spatial positions of the survey directions, (AI)($\theta_{kn},\phi_{kn}$) and (PI)($\theta_{mn}, \phi_{mn}$) respectively, represented in the orthogonal angle coordinate basis (Θ,Φ) and counted in points $t_n$ from the spatial position of the vector $r_n$ determining the spatial orientation of the antenna aperture plane at time points $t_n$, as well as the value n will be connected with the selected law for variation of the spatial orientation of the antenna axis of rotation ($\Theta_{an},\Phi_{an}$), in which case the value of each count will be connected with the level of the signal received at the same time points $t_n$, and each sequence will correspond to a separately created antenna beam.

In doing so, K antenna beams will participate in the formation of the radar image (AI) and M antenna beams will participate in the formation of the radiometric image (PI) (for example, K=8, M=8). In this case, the survey directions (AI) $\phi_{kn}$ and (PI)$\phi_{mn}$ will be the same for all the antenna beams at any time point $t_n$ (for example, $\phi_{kn}=\phi_{mn}$=0), while the survey directions (AI)$\theta_{kn}$ for K beams for radar image will at any time point $t_n$ differ from each other, and the directions (PI)$\theta_{mn}$ for M beams for radiometric image will differ from each other at any time point $t_n$.

The directions (AI)$\theta_{kn}$ and (PI)$\theta_{mn}$ are formed in the antenna with dispersion properties (for example, with the angle frequency factor ~1°/1 GHz) due to frequency division of the reception directions by the spatial coordinate Θ respectively into K and M independent directions by way of selecting from the overall frequency band Δf of the antenna narrow frequency bands, (AI)$\Delta f_k$ and (PI)$\Delta f_m$ respectively (for example, Δf=20 GHz, $f_{min}$=80 GHz, $f_{max}$=100 GHz), $\Delta f_k$=500 MHz, and all the bands (AI)$\Delta f_k$ will in total occupy the frequency band from 80 to 84 GHz, $\Delta f_m$=500 MHz, and all the bands (PI)$\Delta f_m$ will in total occupy the frequency band from 96 to 100 GHz). In this case, each of the reception bands will describe a separate channel, respectively, with number k within the radar part of the system and with number m within the radiometric part of the system. Due to the said antenna properties, two beam groups will be formed within the space, 8 beams in each group, and these beam groups will appear distant from each other by the coordinate θ by the angle distance between the extreme beams, equal to 20°.

Because the antenna axis of rotation is located in the middle of the angle sector by the coordinate θ, which sector corresponds to the selected sector of viewing angles, for example $(\Theta_a, \Phi_a)$=(10°, 0°), two beam groups formed, (AI)$(\theta_{kn}, \phi_{kn})$ and (PI)$(\theta_{mn}, \phi_{mn})$, will appear positioned along the same circular diameter, routes of beams with the same indices k and m in each group will be identical, beams with indices K and M will be external and in the course of the antenna rotation around its axis of rotation will form a cone with circular observation traces within the space, and the routes of the other beams will appear concentrically inserted into the beam travel cone formed. At the same time, using each of two beam groups, the space will be surveyed within the sector of viewing angles by the coordinate θ for approximately 4°. In doing so, no space will be surveyed within the cone of viewing angles formed. Due to the selected law of variation of the spatial orientation of the antenna axis of rotation (for example, due to the above-mentioned precession) during the interval T the cone of viewing angles formed will change its spatial orientation, resulting in the displacement of the beam routes and consequent change of angular coordinates of the observed elements. As a result, in the event of the complete revolution of the axis of the rotating antenna around the precession axis, all the space elements within the selected sector of viewing angles will appear surveyed (for example, inside the spatial angle with the vertex angle of 40°).

When the antenna is rotating in the course of imaging, the position of the polarization vector of the transmitted and received emission for each of the survey directions (AI)$(\theta_{kn}, \phi_{kn})$, (PI)$(\theta_{mn}, \phi_{mn})$ will synchronously for all the beams change its orientation according to the cyclic law with the antenna rotation period $T_a$. As a result of this, the polarization vector of the transmitted and received emission will rotate within the space with the antenna rotation period $T_a$.

Based on the time dependencies obtained at the interval T containing data counts for travel traces of all the antenna beams, operations of generating 2D radar (AI) and radiometric (PI) images will be carried out, in which case the sequences of time counts (AI)$t_{nk}$ at the time interval T will be used for radar imaging (AI) while the sequences (PI)$t_{nm}$ at the time interval T will be used for radiometric imaging (PI). As the operating frequency bands used for emitting radar signals and receiving radiometric signals do not overlap, the emission source will not affect the quality of data obtained in the sequences (PI)$t_{nm}$ used for generating radiometric images. In this case, the brightness of the image elements will be connected with the values of respective counts n within the time sequences (AI)$t_{nk}$ and (PI)$t_{nm}$, while the spatial coordinates of the image elements will be determined based on the count numbers n within the time sequences based on the selected spatial motion law for the antenna axis of rotation and vector r determining the change of the orientation of the antenna aperture plane within the interval T.

In doing so, while forming radar images (AI) for counts with the same spatial coordinates within the interval T (i.e. for space elements surveyed by the beams (AI)$(\theta_{kn}, \phi_{kn})$ several times) subject to displaced positions of the beam traces, an operation will be performed for averaging values taken from the sequences (AI)$t_{nk}$ for each of the independent values of the spatial coordinates, while in forming radiometric images (PI) for counts with the coincident spatial coordinates within the interval T (i.e. for space elements surveyed by the beams (PI)$(\theta_{mn}, \phi_{mn})$ several times), an operation will be performed for averaging values taken from the sequence (PI)$t_{nm}$ for each of the independent values of the spatial coordinates. As such data were obtained at different time points for different positions of the polarization vector of the emission received by the antenna, for most image elements averaging will be made with different orientation of the polarization vector, which may reduce the uncertainties in the data interpretation in solving some remote sensing tasks, connected with the polarization dependence of the reflected and emitted signals for different types of observed natural and artificial objects.

If necessary, both sequences of counts (AI)$t_{nk}$ and (PI)$t_{nm}$ may be cyclically used to form combined composite images for which the brightness and/or color of each image element are/is determined based on the decision rule in the course of additional calculations carried out with count values for the same spatial elements taken from current radar (AI) and radiometric (PI) images. For example, as the decision rule applied in the course of additional calculations carried out with count values for the same spatial elements taken from radar (AI) and radiometric (PI) images, the principle of belonging of the values of these elements to one of the clusters c (C≥c≥1) from their total number C (C≥2), formed in the 2D basis based on the intercrossing of the radar and radiometric signal values for C observed objects, may be used.

The said algorithm may be repeated many times, resulting in obtaining a series of successive radar and radiometric images.

Without prejudice to the generality of the submitted method, other options of its implementation will be possible, depending on the selected operating frequency bandwidth of the antenna Δf, location within this bandwidth of frequency bands used in forming radar and radiometric images, law of variation of the spatial orientation of the antenna axis of rotation, possibility of using additional antennae for illumination of the observed space domain, and type of the irradiation source.

An option of the method implementation may include combination of characteristics, for which the antenna frequency band has a value insufficient for radar and radiometric imaging within the required sector of viewing angles. In this case, the antenna axis of rotation may be positioned so that both groups of the antenna beams (AI)$(\theta_{kn}, \phi_{kn})$, (PI)$(\theta_{mn}, \phi_{mn})$ are located on one side from the antenna axis of rotation along the coverage area diameter (see FIG. 4b,d). The specific feature of such option includes the different size of the radar and radiometric image, in which case the larger image size (larger survey area) will be implemented for the image (either radar or radiometric) for which a beam is formed with the largest angle deviation from the antenna axis of rotation.

Another method implementation option may be the combination of characteristics, for which a broadband noise signal source is used as an emission source. In one case, the band of the noise emission source may coincide with the operating frequency band of the antenna Δf, in which case the number of beams K used for radar imaging (AI) may be the same as the number of beams M used for radiometric imaging (PI), K=M, and the spatial positions of the beams (AI)$(\theta_{kn}, \phi_{kn})$, (PI)$(\theta_{mn}, \phi_{mn})$ will be also mutually correspondent. In this case, radar (AI) and radiometric (PI) images will be formed alternately within the interval 2T, in which case in the radar imaging mode, the sequence of counts $(AI)t_{nk}$ at the interval T will be formed with the activated noise emission source, and in the radiometric imaging mode, the sequence of counts $(PI)t_{nm}$ at the interval T will be formed with the deactivated noise emission source. In other case, the band of the noise emission source may only coincide with the frequency band used for radar imaging (AI). In this case, radar (AI) and radiometric (PI) images will be formed simultaneously at the interval T with the permanently activated noise signal source.

Another method implementation option may be the combination of characteristics, for which a variable frequency signal source is used as an emission source. In this case K beams used for radar imaging (AI) are formed due to the continuous or step variation of the frequency of the emission source according to the cyclic law within the overall frequency band of the radar image $\Delta f_{AI}$ comprising partial bands $(AI)\Delta f_k$, $\Delta f_{AI} \in (AI)\Delta f_k$, where the source frequency variation increment is equal to the partial frequency bandwidth $(AI)\Delta f_k$, and the source frequency variation cycle and corresponding variation of the spatial orientation of K beams in the radar image (AI) is carried out for a time interval not exceeding a single increment $\Delta t$ within the sequence $t_n$. As a result, in order to form a radar image, the antenna will form a single beam taking, as a result of linear scanning along the image radius, K independent positions in terms of the coordinate θ.

Another method implementation option may be the combination of characteristics, for which K pulse emission sources are used as an emission source, operating simultaneously within K frequency bands $(AI)\Delta f_k$ respectively, in which case as additional information obtained for each element in the radar image (AI), the value of the distance between the antenna and reflecting space element may be used, which will be calculated for one or each of the K channels based on the time delay of the received signal in relation to the emitted one.

One more method implementation option may include the combination of characteristics, for which two independent identical and synchronously rotating antennas will be used for transmission and reception, transmitting and receiving respectively, installed on a common positioning device and having equal number of beams K in each, formed within the same frequency bands $(AI)\Delta f_k$, and equal number of beams M in each, formed within the same frequency bands $(PI)\Delta f_m$. In this case, spatial coordinates of the beams $(AI)(\theta_{kn},\phi_{kn})$, $(PI)(\theta_{mn},\phi_{mn})$ for the transmitting antenna coincide in couples with those of the beams $(AI)(\theta_{kn},\phi_{kn})$, $(PI)(\theta_{mn},\phi_{mn})$ for the receiving antenna. Such combination will allow improving the isolation between the emission source and reception channels of the system, for example, when the emission source is operated in the broadband mode.

One more option of the method implementation may include the combination of characteristics, for which an additional antenna is used for emission, called transmitting antenna, however having no dispersion properties and forming a single beam within the space, of which the width of the spatial angle is no less than the total spatial angle occupied by the beams $\Delta f_{AI} \in (AI)\Delta f_k$ of the receiving antenna, and the spatial orientation of which coincides with the center of the spatial angle in which the beams $(AI)(\theta_k,\phi_k)$ are located. In this case, the transmitting antenna with the period $T_a$ will rotate synchronously with the receiving antenna around its axis of rotation, of which the spatial orientation at each time point $t_n$ will coincide with that of the rotation axis of the receiving antenna, in which case the orientation of the polarization vector for signals of the transmitting and receiving antennas is the same at each time point $t_n$.

Another option of the method implementation may include the combination of characteristics, for which in order to irradiate the observed space element, a pulse emission source operating within one of the frequency bands $(AI)\Delta f_k$ and a noise signal source with the operating frequency band corresponding to the frequency band $\Delta f_{AI}$ of the antenna used to generate radar emission, except for the frequency band used by the pulse emission source, will be simultaneously used.

Another option of the method implementation may include the combination of characteristics, for which in order to irradiate the observed space element, a variable frequency signal source and a noise signal source with the operating frequency band corresponding to the operating frequency band of the antenna $\Delta f_{AI}$ used to generate radar emission, except for the frequency band used by the variable frequency signal source, will be simultaneously used.

One more option of the method implementation may include the combination of characteristics, for which the radar and radiometric imaging is carried out for the plane of the observed objects, located within the near antenna zone, in which case additional focusing of the antenna with the help of a fixed or synchronously rotating lens is used to form survey elements with required spatial dimensions.

The submitted antenna to implement the radar and radiometric imaging method, according to its first embodiment option, contains (see FIG. 9) a bearing device 1, 2D diffraction grating 2, connected in series planar dielectric waveguide 3, linear waveguide turn 4 and feed-adapter 5, as well as a rotating waveguide adapter 6, electromechanical drive 7, angular momentum compensator 8, position sensor 9 and positioning device 10, where 2D diffraction grating 2, planar dielectric waveguide 3, linear waveguide turn 4 and feed-adapter 5 are rigidly mechanically connected with each other and form a single structural assembly named as antenna rotor 11, and electromechanical drive 7, angular momentum compensator 8, position sensor 9 and rotating waveguide adapter 6 are installed on bearing device 1, the output shaft of electromechanical drive 7 defines the main axis of rotation 14, while the rotation axes of angular momentum compensator 8 and rotating waveguide adapter 6 coincide with main axis of rotation 14, angular momentum compensator 8 is connected, via a kinematic diagram, with the output shaft of electromechanical drive 7, and in addition antenna rotor 11 is rigidly mechanically connected with the output shaft of electromechanical drive 7, in which case position sensor 9 is linked to antenna rotor 11, the informative parameter of the output signal of position sensor 9 is linked to the angular position of antenna rotor 11 when rotating around the main axis, and in addition planar dielectric waveguide 3 and 2D diffraction grating 2 are connected over the diffraction field, the side of planar dielectric waveguide 3 on which the received emissions falls represents the receiving aperture plane, the input of electromechanical drive 7 and the output of position sensor 9 act as the control input and output of the antenna respectively, the output of feed-adapter 5 is connected to rotating input 6-1 of rotating waveguide adapter 6, of which fixed output 6-2 acts as the antenna output, angular momentum compensator 8 has the rotation direction opposite to that of antenna rotor 11, and bearing device 1 is mechanically connected to positioning device 10, where positioning device 10 changes, by means of repositioning of bearing device 1, the spatial position of the main axis of rotation according to a preset law and at each arbitrary time point $t_n$ counted from the time of beginning of its successive operating cycle with the duration of T $(T \geq t_n \geq 0)$, $(N \geq n \geq 1)$ $n = t_n/\Delta t$, with the time interval $\Delta t$ spent in the course of rotation of the antenna for the beam transition from one independent state to another, forms at its information output data about the spatial orientation of the antenna axis of rotation ($\Theta_{an}, \Phi_{an}$), represented in the orthogonal angular coordinate basis ($\Theta, \Phi$).

Figure 14B:
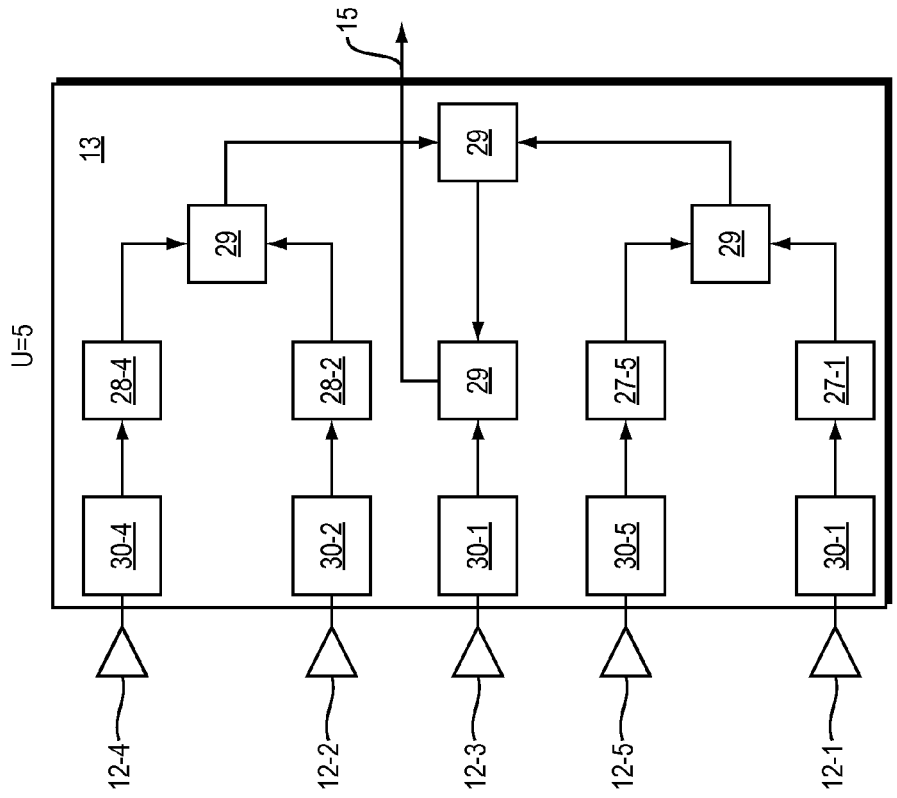
FIG. 14B provides another example of the arrangement of the phasing unit according to the second example of the present invention.

The submitted antenna to implement the radar and radiometric imaging method, according to its second embodiment option, contains (see FIG. 9, FIG. 10, FIG. 14) a bearing device 1, rotating waveguide adapter 6, electromechanical drive 7, angular momentum compensator 8, position sensor 9 and positioning device 10, as well as U (U≥2) antenna elements 12-$u$ (1≤$u$≤U) and phasing unit 13 with U inputs and a single output, in which case electromechanical drive 7, angular momentum compensator 8, position sensor 9 and rotating waveguide adapter 6 are installed on bearing device 1, the output shaft of electromechanical drive 7 defines the main axis of rotation, while the rotation axes of angular momentum compensator 8 and rotating waveguide turn 6 coincide with the main axis of rotation, angular momentum compensator 8 is connected, via a kinematic diagram, with the output shaft of electromechanical drive 7, and in addition each antenna element 12-$u$ (1≤$u$≤U) consists of diffraction grating 2-$u$ and connected in series planar dielectric waveguide 3-$u$, linear waveguide turn 4-$u$ and feed-adapter 5-$u$, of which the output acts as the output of the respective antenna element 12-$u$, where for each of u antenna elements 12-$u$, planar dielectric waveguide 3-$u$ and 2D diffraction grating 2-$u$ are connected over the diffraction field, and the side of planar dielectric waveguide 3-$u$ on which the received emission falls, acts as the aperture plane of the respective antenna element 12-$u$, while in addition for each antenna element 12-$u$, planar dielectric waveguide 3-$u$, 2D diffraction grating 2-$u$, linear waveguide turn 4-$u$ and feed-adapter 5-$u$ are rigidly mechanically connected with each other, in which case outputs of U antenna elements 12-$u$ are connected to U inputs of phasing unit 13, U antenna elements 12-$u$ and phasing unit 13-$u$ are rigidly connected with each other and form a single structural assembly named as antenna rotor 11, where the said antenna rotor 11 is rigidly mechanically connected with the output shaft of electromechanical drive 7, in which case position sensor 9 is linked to antenna rotor 11, the informative parameter of the output signal of position sensor 9 is linked to the angular position of antenna rotor 11 when rotating around the main axis, the input of electromechanical drive 7 and the output of position sensor 9 act as the control input and output of the antenna respectively, the output of phasing unit 13 is connected to rotating input 6-1 of rotating waveguide adapter 6, of which fixed output 6-2 acts as the antenna output 15, angular momentum compensator 8 has the rotation direction opposite to that of antenna rotor 11, and bearing device 1 is mechanically connected to positioning device 10, where positioning device 10 changes, by means of repositioning of bearing device 1, the spatial position of the main axis of rotation according to a preset law and at each arbitrary time point $t_n$ counted from the time of beginning of its successive operating cycle with the duration of T (T≥$t_n$≥0), (N≥n≥1) n=$t_n/\Delta t$, with the time interval $\Delta t$ spent in the course of rotation of antenna rotor 11 for transition of the antenna beams from one independent state to another, forms at its information output data about the spatial orientation of the antenna axis of rotation ($\Theta_{an}, \Phi_{an}$), represented in the orthogonal angular coordinate basis ($\Theta, \Phi$).

When executed according to the first and second options, in order to create a multi-beam directional diagram therein with two beam groups 16 and 17 used for radar (AI) and radiometric (PI) imaging respectively, the antenna should be connected to a frequency-division channeling multi-channel radar-radiometric system. Possible options of such system are presented in this application.

Any fixed base may be used as bearing device 1, having a mounting plane to fix component elements of the scanning antenna and ensuring in the course of operation unchangeable spatial orientation of main axis of rotation 14 of electromechanical drive 7 in relation to the mounting plane.

Any hollow-shaft mechanical drive may be used as electromechanical drive 2, ensuring direct or reduced synchronized uniform rotation of the shaft and any elements attached thereto with a preset speed.

Diffraction grating 2 and planar dielectric waveguide 3 may be executed according to known technical solutions (for example, see Scanning Antenna of Aircraft Radiometric Complex/Andrenko S. D., Yevdokimov A. P., Kryzhanovsky V. V., Provalov S. A., Sidorenko Yu. B.//Radiophysical Methods and Facilities for Millimeter Wave Environmental Research: Collection of Scientific Papers—Kyiv: Naukova Dumka, 1988.—pp. 154-160). For example, planar dielectric waveguide 3 may be made of a polystyrene sheet with a preset thickness based on the mechanical plane grinding technology. Diffraction grating 2 may be made as a flat metal comb, of which lateral dimensions are defined in the orthogonal coordinate basis X and Y, and along the coordinate X the grating has a periodic structure, while along the coordinate Y the grating has a regular structure. In this case, the reference plane $\Theta$ of the antenna directional pattern coincides with the coordinate axis X and is orthogonal to the coordinate axis Y. Dielectric waveguide 3 is located at a certain distance $\Delta$ from the periodic structure of diffraction grating 8 and connected therewith over the diffraction field. In order to form a preset X-direction amplitude-phase field distribution, the distance between the grating and waveguide should be selected in the course of setting and may be variable along the coordinate X according to a linear or non-linear law.

Figure 11A:
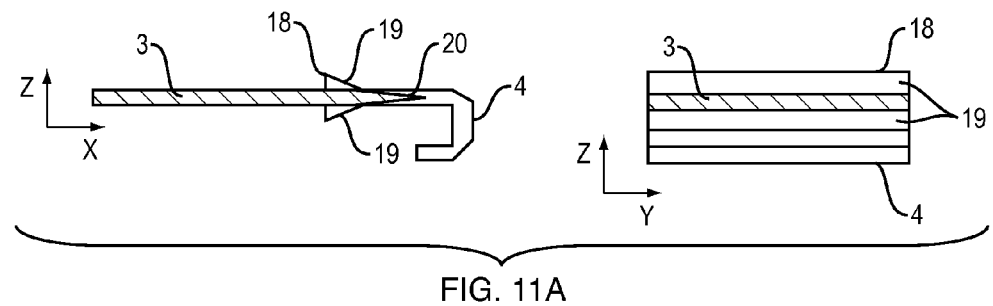
FIG. 11A provides one possible execution options of the antenna elements.
Figure 11B:
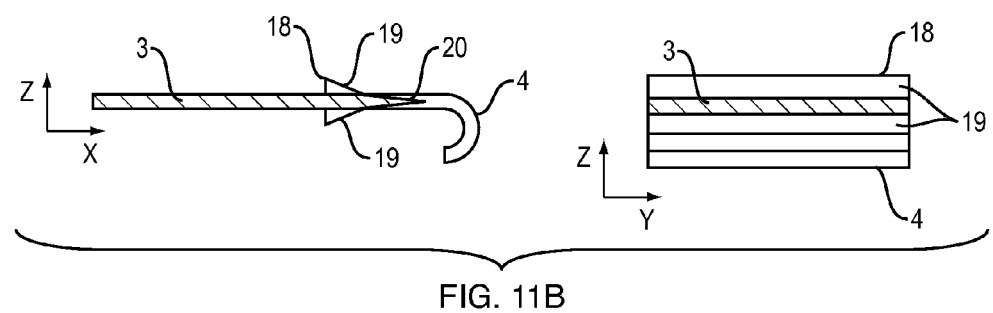
FIG. 11B provides another possible execution option of the antenna elements.
Figure 11C:
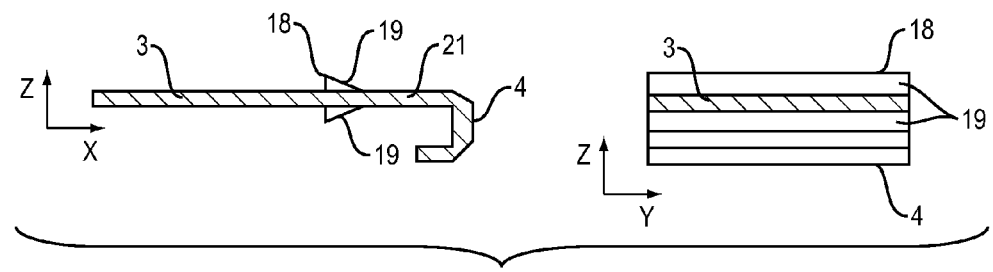
FIG. 11C provides another possible execution option of the antenna elements.

Linear waveguide turn 4 may be executed based on the known technical solution for a 90-degree angular turn within a regular hollow-type metal waveguide in the plane of the electric field vector E, made using an internal flat reflecting segment, by combining two 90-degree turns into a single 180-degree turn and increasing the cross-section of such waveguide in the direction of the field vector H up to the size corresponding to that of the receiving aperture of the antenna (see FIG. 11$a$). Linear waveguide turn 4 may be also executed based on a 180-degree smooth turn of a hollow-type metal waveguide, subject to dimensions of the input and output openings of the waveguide, corresponding to those of the cross-section of planar dielectric waveguide 3 (see FIG. 11$b$). In doing so, in the junction point of planar dielectric waveguide 3 with waveguide turn 4, for the purpose of adaptation, the latter may have a bell mouth 18 with flat or bent side faces 19, while for the purpose of adaptation to the linear waveguide turn, planar dielectric waveguide 3 itself may be furnished with a variable-thickness section 20, with a linear or non-linear law of variation of the thickness depending on the axial coordinate. Linear waveguide turn 4 may be also implemented due to direct embodiment of planar dielectric waveguide 3 with a stepped or smooth 180-degree turn of the dielectric material, with a continuous conductive layer 21, for example in the form of thin metal film, applied to the respective part of the surface of the planar dielectric waveguide (see FIG. 11C).

Figure 12:
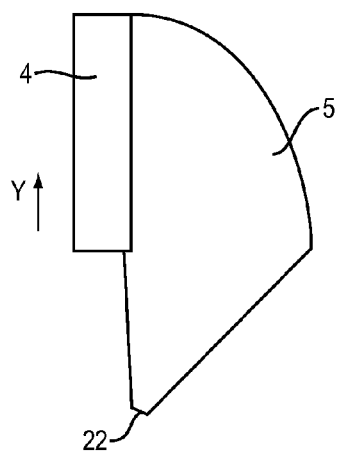
FIG. 12 shows an example of the configuration of the linear waveguide turn and feed-adapter of the antenna.

Feed-adapter 5 may be executed according to any known technical solution for the exciter of the planar dielectric waveguide ensuring the preset transverse filed structure at the junction with the dielectric waveguide of the selected cross-section (Y-direction) and concentration of electromagnetic energy at the output flange of adapter 22 with the field structure for the dominant wave $H_{01}$ of the standard hollow-type metal waveguide. A horn-type exciter or horn-parabolic exciter may be used as feed-adapter 5 (for example, see Scanning Antenna of Aircraft Radiometric Complex/Andrenko S. D., Yevdokimov A. P., Kryzhanovsky V. V., Provalov S. A., Sidorenko Yu. B.//Radiophysical Methods and Facilities for Millimeter Wave Environmental Research: Collection of Scientific Papers—Kyiv: Naukova Dumka, 1988.—pp. 154-160), ensuring a single-mode electromagnetic energy transmission mode (see FIG. 12). Linear turn 4 and feed-adapter 5 may be made jointly or planar dielectric waveguide 3, linear turn 4 and feed-adapter 5 may be made jointly by way of respective shaping of the dielectric material and applying to a part of its surface (out of the area of planar dielectric waveguide 3 and flange 22) of a continuous metal coating, for example in the form of 3-10 micrometer thin copper layer applied by vacuum spraying of copper atoms.

Any known type of rotating waveguide joint may be used as rotating waveguide adapter 6, ensuring electromagnetic energy transmission from its rotating waveguide input to its fixed waveguide output with low losses within the operating frequency band of the scanning antenna $\Delta f$. For example, the rotating waveguide joint may be applied as the rotating waveguide adapter, as considered in (Buduris J., Chenevier P. Microwave Circuits (Theory and Application). Translation from French/Under the editorship of A. L. Zinovyev.—M. Soy. Radio, 1979,—288 pages, p. 130) and comprising input and output sections of hollow-type rectangular waveguides, each of which over a wide wall has elements of transition to a circular waveguide with conversion of the dominant wave $H_{01}$ in the rectangular waveguide into wave $E_{01}$ of the circular waveguide. In doing so, the mentioned sections of the circular waveguides are positioned axially to the rotation axis and form a waveguide line with a ball joint and circular gap over the circular waveguide wall; electric interlocking for microwave currents is ensured using quarter-wave traps in the area of the ball joint. When using such waveguide joint as rotating waveguide adapter 6, its transmission line based on a circular waveguide with a ball joint will be installed inside the hollow output shaft of the electromechanical drive axially to the main axis of rotation (14), on of the rectangular waveguide sections will be rigidly connected to the shaft and its waveguide flange will be the waveguide input of movable rotor section 6-2 of adapter 6, while the second rectangular waveguide section will be rigidly attached to the base 1, its waveguide flange will be the waveguide output of stator section 6-1 of adapter 6.

Any hollow-shaft mechanical drive may be used as electromechanical drive 7, ensuring direct or reduced synchronized uniform rotation of the shaft and any elements attached thereto with a preset speed. In this case, the input of the control bus of the drive is the control input of electromechanical drive 7. For example, such electromechanical drive may be implemented based on a reduced step motor (Patent (UA) No. 56347, G01S13/95, 15 May 2003, Multi-Beam Scanning Microwave Radiometer). In this case, it will consist of mechanically connected step electric motor and reducing gear, as well as pulse power amplifiers for step motor control signals, the number of which corresponds to the number of phase power supply windings of the step motor, where each of the pulse amplifiers is connected in series between the respective line of the input bus of drive 7 and respective lead of the phase power supply winding of the step electric motor. In this regard, input electric leads of the power amplifiers and the output shaft of the reducing gear act as the control input and shaft of electromechanical drive 7 respectively.

Figure 13A:
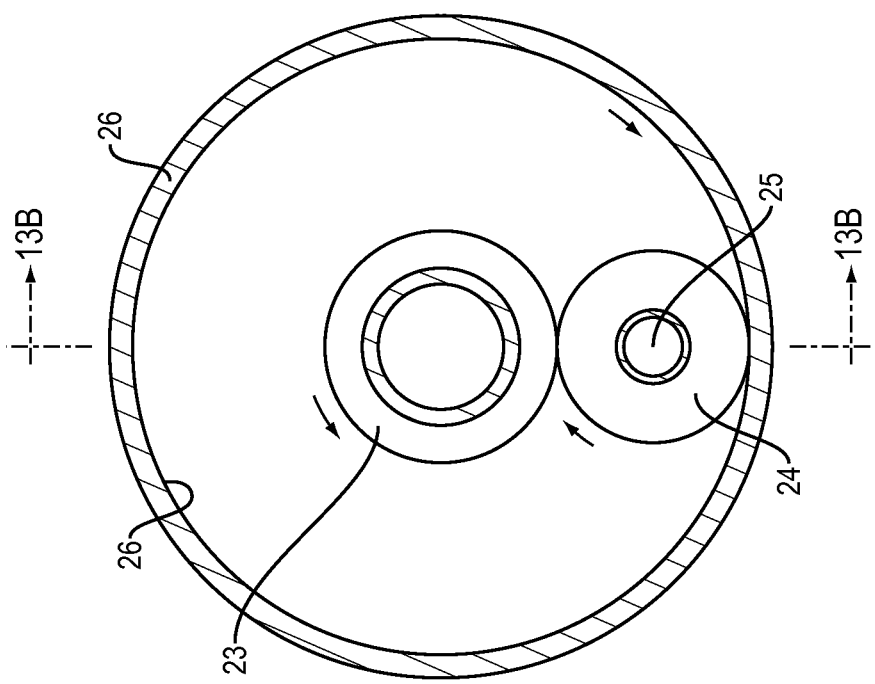
FIG. 13A provides a front view of a possible option of the arrangement of the rotation torque/moment compensator.

Angular momentum compensator 8 is designed for compensation of the moment of momentum arising for the antenna rotor in the course of rotation with a high speed, which makes it difficult to change the spatial position of the main axis 14 due to the arising gyroscopic effect. Any technical solution may be used as angular momentum compensator 8, ensuring uniform rotation of some body with the weight $M_{comp}$ with the preset angular speed $\omega_{comp}$ and with some effective rotation radius $R_{comp}$ in the direction opposite to the compensated angular momentum of the antenna rotor. For example, according to the provisions of (Kuhling H. Physics. Directory, Translation from German/Under the editorship of E. M. Leykin.—M.: Mir, 1980,—pp. 520), such compensator may be executed according to the kinematic diagram shown in FIG. 13 and may include drive gear 23 installed at the output shaft of electromechanical drive 7, idle gear 24, of which axis 25 is fixed on base 1, and disk 26 with center bearing ensuring free rotation of disk 26 around the shaft of drive 7, in which case disk 26 has drive surface 27 corresponding to the working surface of gear 24. Such arrangement will ensure rotation of the disk with the weight $M_{comp}$ and effective radius $R_{comp}$ in the direction opposite to the rotation of the shaft of drive 7 with the angular speed determined by the angular rotation speed of the shaft of drive 7 and the transmission factor $K_{comp}$ of the mentioned kinematic diagram. Due to the selection of the disk weight $M_{comp}$, its radius $R_{comp}$ and transmission factor $K_{comp}$ of the kinematic diagram, one can ensure full compensation of the angular momentum of the antenna rotor 11 when rotating with a constant speed around axis 14, which allows changing the spatial orientation of main axis 14 in the course of the antenna scanning.

Position sensor 9 may be executed based on any technical solutions ensuring formation of a pulse electrical signal, once the predetermined spatial position of the controlled element is achieved, for example, on the basis of magnetic sensor. In this case, a permanent controlling magnet will be installed on one of structural elements of the antenna rotor, for example, on the rear side of diffraction grating 2, while an inductance coil will be installed on bearing device 1 near by the circular path of rotation of the magnet, included in the oscillating circuit of the electronic generator. When passing the magnet, the generator frequency will change, resulting in activation of the comparator generating an output signal of position sensor 9, corresponding to the initial position of the rotor.

Figure 14A:
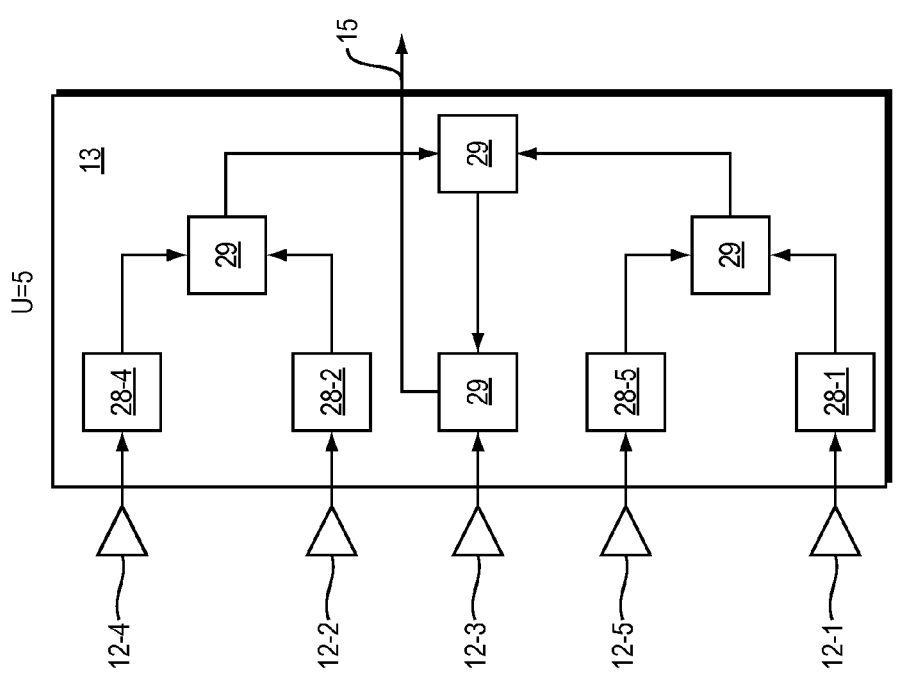
FIG. 14A provides an example of the arrangement of the phasing unit according to the second example of the present invention.

Phasing unit 13 may be built on the basis of the known scheme for phased antenna array and contain elements in the form of time delay lines 28 and balance summing units 29 operating within the operating frequency band of the antenna $\Delta f$. The possible diagram of the phasing unit for antenna with five antenna elements (U=5) is shown in FIG. 14a. In this case, signal from the central antenna element (for example, 12-3 for U=5) is directly supplied to output balance summing unit 29, while signals from twin antenna elements 12-2 and 12-4, and 12-1 and 12-5 (see FIG. 10) will be subject, prior to mutual summation, to additional time delays equal in total to the additional electromagnetic wave propagation time within the longer central antenna section 12-3. As a result, signals from all antenna sections 12-$u$ are summed in phase for equal time of propagation from respective antenna element to the input of phasing unit 13.

Figure 13B:
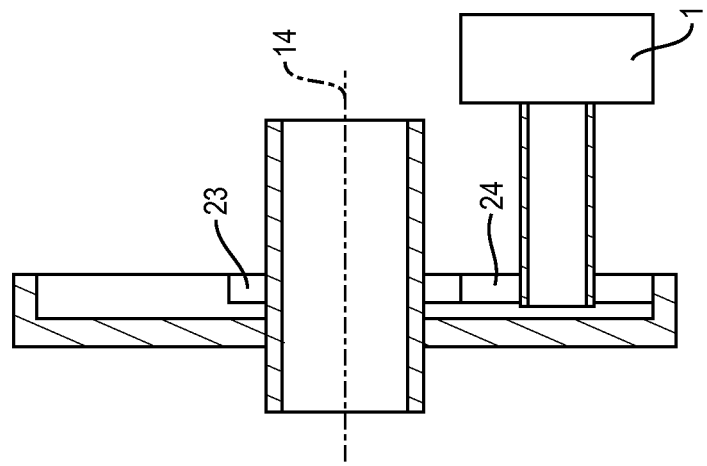
FIG. 13B provides a side view of a possible option of the arrangement of the rotation torque/moment compensator.

Without prejudice to the generality of the foregoing, an embodiment option of phasing unit 13 may be proposed, with low-noise amplifiers 30-$u$ at the input (see FIG. 13b). Such structural option of the phasing unit may be applied in one of the options of the proposed method, when using the antenna in passive mode, when the survey area is irradiated for the purpose of forming a radar image using an additional transmitting antenna.

Also without prejudice to the generality of the foregoing, an embodiment option of phasing unit 13 may be proposed, in which signals may be summed with a certain decrease of their relative level in order to form a decreasing to edges field distribution within the antenna aperture along the coordinate Y, with respect to the signal in the central part of the aperture. In this case, the signal depression operation for peripheral antenna elements may be carried out by means of additional fixed microwave attenuators (for example, combined with elements of delay lines 28) or due to respective selection of amplification factors of amplifiers 30.

Elements of delay lines 28 may be executed based on sections of regular transmission lines, for example, on the basis of waveguide transmission lines. Balance summing units 29 may be executed based on standard waveguide route elements with in-phase division/integration of signals, for example, based on T bridges.

Any electromechanical drive with a working mounting plane may be used as positioning device 10, on which bearing device 1 is installed. In doing so, the positioning device should function cyclically according to a preset program with a cycle recurrence period T and change angular orientation of mounting plane 31 within the time T according to the selected law, thereby ensuring the predetermined variation of the spatial orientation of antenna main axis of rotation 14. For example variation of orientation of the mounting plane 31 may be selected as an operating program for positioning device 10, with the motion of antenna axis of rotation 14 according to the line-frame spatial law or according to the law of motion of rotation axis 14 along a conic generatrix. Internal control of the positioning device may be arranged, for example, on the basis of a microprocessor set, in which case at the output of positioning device 10 during the T-length cycle at time points $t_n$, digital values $(\Theta_{an}, \Phi_{an})$ are formed, corresponding to current positions of the landing plane and, consequently, to rotation axis 14 in the angular basis $(\Theta, \Phi)$. In this case, these data exchange with external devices may be arranged using standard information exchange lines between microprocessor sets, for example based on the TCP/IP data exchange protocol.

Figure 15A:
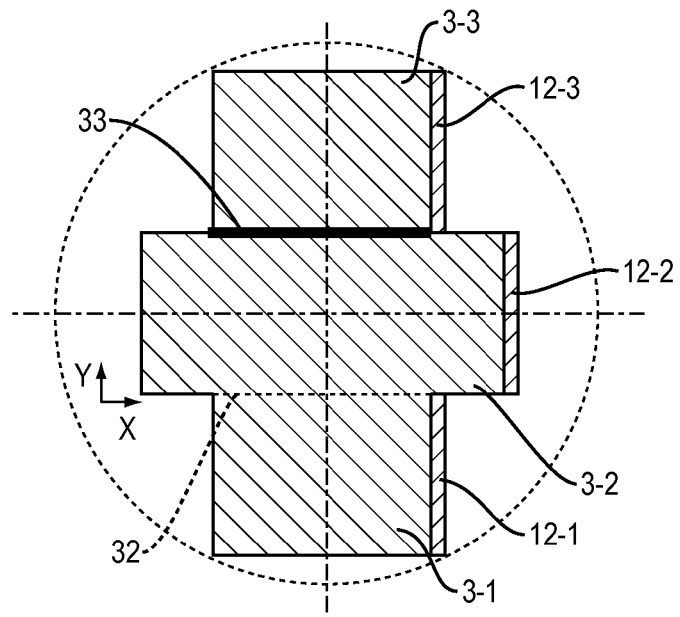
FIG. 15A provides an option of the technological embodiment of the planar dielectric waveguide.
Figure 15B:
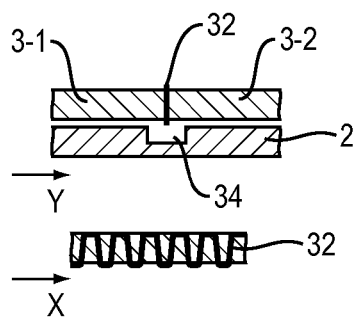
FIG. 15B provides another option of the technological embodiment of the planar dielectric waveguide.
Figure 15C:
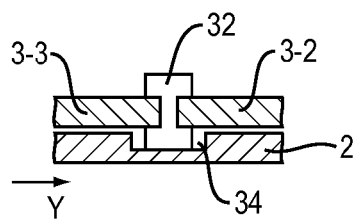
FIG. 15C provides another option of the technological embodiment of the planar dielectric waveguide.

The described embodiment options of the antenna elements do not exclude any other possible methods of their implementation. For example, without prejudice to the generality of the foregoing, embodiment options may be proposed for antenna elements 12, for which common diffraction grating 2 will be used, with the respective dimensions and configuration. Another possible option will include manufacturing antenna sections 12 with a single or divided into sections planar dielectric waveguide 3 (see FIG. 15). In doing so, for the option with a single planar dielectric waveguide, the sections may be formed due to perforation and weaving the dielectric waveguide with a metal thread 32 with the perforation pitch much more lesser than the emission wavelength in the waveguide. Such metal thread will perform functions of separating metal wall. Another option may include combination of different sections of the planar dielectric waveguide into a common structure using metal holders 33. Both in the first and second case, in order to exclude adverse interaction between the received electromagnetic field and diffraction grating 2 in the locations where metal separation elements 32 and 33 are placed, diffraction grating 2 should be furnished with areas 34 free from diffraction elements.

According to the possible implementation options of the proposed radar-radiometric imaging method, without prejudice to the generality of the foregoing, some other antenna implementation options will be possible.

Figure 16A:
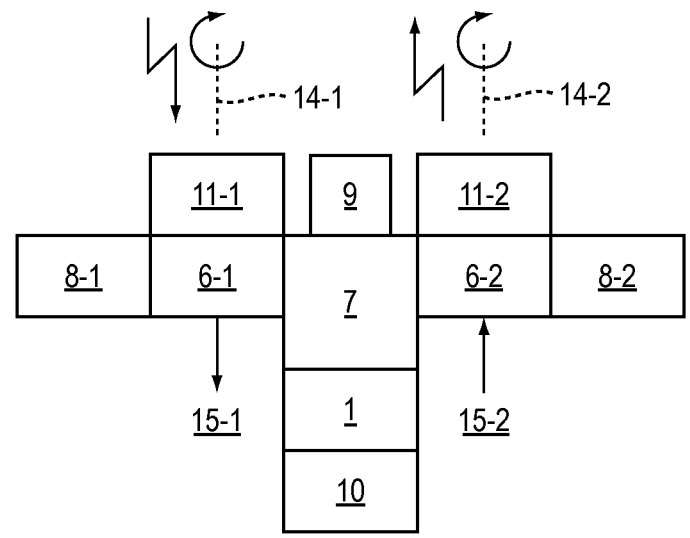
FIG. 16A shows an option of the arrangement of the antenna with two separately rotating transmitting and receiving rotors according to the third example of the present invention.
Figure 16B:
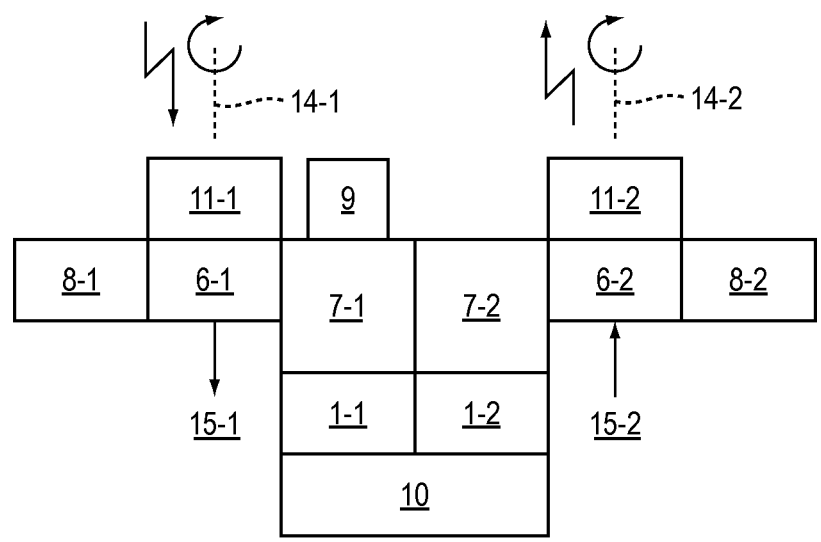
FIG. 16B shows another option of the arrangement of the antenna with two separately rotating transmitting and receiving rotors.

For example, the third antenna embodiment option will be possible (FIG. 16*a*), according to which it contains two sections named receiving and transmitting, each of which consists of rotating rotor 11, rotating waveguide adapter 6 and angular momentum compensator 8, where electromechanical drive 7 has two shafts synchronously rotating in the same direction with the same rotation speeds and having two collinear in space main axes of rotation 14-1 and 14-2, with rotors 11 of the receiving and transmitting sections, which are rigidly connected with the first and second shaft of the electromechanical drive respectively, rotating waveguide adapter 6 of the receiving section of the antenna is installed inside the first shaft of the electromechanical drive, its rotating input is connected with the rotor output of receiving section 11 of the antenna, while the fixed output is the receiving output of the antenna 15-1, rotating waveguide adapter 6 of the transmitting section of the antenna is installed inside the second shaft of the electromechanical drive, and its rotating input is connected with the rotor output of the transmitting section of the antenna, while the fixed output is the transmitting output 15-2 of the antenna, in which case angular momentum compensator 8 of the receiving section is connected with the first shaft of the electromechanical drive and rotates in the direction opposite to the rotation direction of this shaft, and angular momentum compensator 8 of the transmitting section is connected with the second shaft of the electromechanical drive and rotates in the direction opposite to the rotation direction of this shaft.

A modification of embodiment option 3 of the antenna will be also possible, where in the receiving section rotor 11 is completely identical to embodiment options 1 and 2, and rotor 11 of the transmitting section contains only feed-adapter 5 executed in the form of weakly directional broadband horn-type antenna having a single beam oriented along rotation axis 14-2, while the beam width of the directional diagram of feed-adapter 5 corresponds to the width of the spatial angle for the survey area of the receiving section of the antenna per single revolution.

The fourth antenna embodiment option will be also possible, according to which it contains three sections named as receiving and the first and second transmitting sections, each of which consists of rotating rotor 11, rotating waveguide adapter 6 and angular momentum compensator 8, where electromechanical drive 7 has three shafts synchronously rotating in the same direction with the same rotation speeds and having three collinear in space main axes of rotation 14-1, 14-2 and 14-3 respectively, and rotors 11 of the receiving and of the first and second transmitting sections are rigidly connected with the first, second and third shafts of the electromechanical drive respectively, rotating waveguide adapter 6 of the receiving section of the antenna is installed inside the first shaft of electromechanical drive 7, its rotating input is connected with the output of rotor 11 of the receiving section of the antenna, and the fixed output is the receiving output 15-1 of the antenna, rotating waveguide adapter 6 of the first transmitting section of the antenna is installed inside the second shaft of electromechanical drive 7, and its rotating input is connected with the output of rotor 11 of the first transmitting section of the antenna, and the fixed output is the first transmitting output 15-2 of the antenna, where rotating waveguide adapter 6 of the second transmitting section of the antenna is installed inside the third shaft of electromechanical drive 7, and its rotating input is connected with the output of rotor 11 of the second transmitting section 15-3 of the antenna, and the fixed output is the second transmitting output of the antenna, in which case angular momentum compensator 8 of the receiving section is connected with the first shaft of the electromechanical drive and rotates in the direction which is opposite to the direction of rotation of this shaft, angular momentum compensator 8 of the first transmitting section is connected with the second shaft of the electromechanical drive and rotates in the direction which is opposite to the direction of rotation of this shaft, while angular momentum compensator 8 of the second transmitting section is connected with the third shaft of the electromechanical drive and rotates in the direction which is opposite to the direction of rotation of this shaft, where the spatial orientation of the polarization vectors of emission of the receiving and the first transmitting sections of the antenna is the same, and the spatial orientations of the polarization vectors of emission of the receiving and the second transmitting sections of the antenna are mutually orthogonal.

Without prejudice to the generality of the foregoing, another antenna embodiment option will be also possible, with an additional axially symmetrical focusing lens ensuring imaging for a selected image plane located at a predetermined distance from the antenna. In such case, the said lens made, for example, from dielectric material and having the lateral dimension not less than the diameter of antenna rotor 11, will be located in front of rotating rotor 11 of the antenna on bearing device 1, with the lens axis coinciding with rotation axis 14 of the antenna.

According to the first embodiment option (see FIG. 17*a*), the millimeter and sub-millimeter wave radar-radiometric imaging system contains antenna 35, radiometric receiver 36, transceiver 37, data collection device 38 and imaging device 39 connected via a bidirectional communication line, as well as antenna drive control device 40 and diplexer 41, in which case the input, the first and second outputs of diplexer 41 are connected to the output of antenna 35, input of radiometric receiver 36 and input of transceiver 37 respectively, the output of radiometric receiver 36 is connected, via a bidirectional multi-channel communication line, to the first input of data collection device 38, and the output and control input of transceiver 39 are connected to the second input and first control output of data collection device 38 respectively, the control input and output of antenna 35 are connected to the control output and input of antenna drive control device 40 respectively, of which the output is connected to the control input of data collection device 38, while the output of antenna positioning device 10 is connected to the third input of data collection device 38.

In this case, scanning antenna 35 may be executed according to option 1 or option 2 as provided in this application.

According to the second embodiment option (see FIG. 17*b,c*), the millimeter and sub-millimeter wave radar-radiometric imaging system contains antenna 35, radiometric receiver 36, transceiver 37, data collection device 38 and imaging device 39 connected via a bidirectional data communication line, as well as antenna drive control device 40 and diplexer 41, in which case the input, the first and second outputs of diplexer 41 are connected to the receiving output of antenna 35, input of radiometric receiver 36 and input of transceiver 37 respectively, the output of radiometric receiver 36 is connected, via a bidirectional multi-channel communication line, to the first input of data collection device 38, the microwave output of transceiver 37 is connected to transmitting output of the antenna 35, and the output and control input of transceiver 39 are connected to the second input and first control output of data collection device 38 respectively, the control input and output of antenna 35 are connected to the control output and input of antenna drive control device 40 respectively, of which the output is connected to the control input of data collection device 38, while the output of antenna positioning device 10 is connected to the third input of data collection device 38.

In this case, scanning antenna 35 may be executed according to option 3 as provided in this application.

Figure 17A:
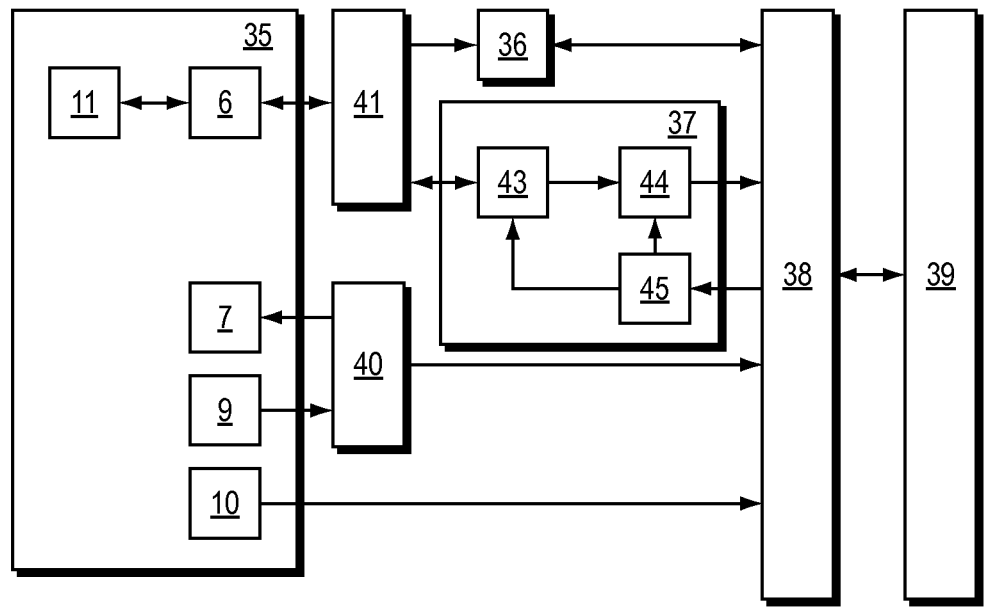
FIG. 17A shows an arrangement options of the millimeter and sub-millimeter wave radar-radiometric imaging system of the first example.
Figure 17B:
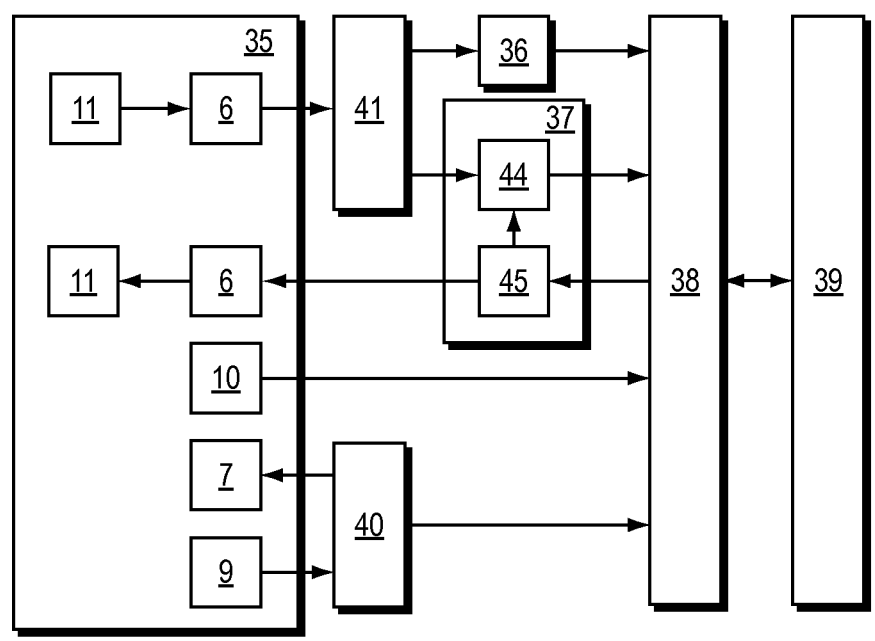
FIG. 17B shows an arrangement option of the millimeter and sub-millimeter wave radar-radiometric imaging system of the second example.

According to the third embodiment option (see FIG. 17*d*), the millimeter and sub-millimeter wave radar-radiometric imaging system contains antenna 35, radiometric receiver 36, transceiver 37, data collection device 38 and imaging device 39 connected via a bidirectional data communication line, as well as antenna drive control device 40, diplexer 41 and switching unit 42, in which case the input, the first and second outputs of diplexer 41 are connected to the receiving output of antenna 35, input of radiometric receiver 36 and input of transceiver 37 respectively, the output of radiometric receiver 36 is connected, via a bidirectional multi-channel communication line, to the first input of data collection device 38, the microwave output of transceiver 37 is connected with the input of switching unit 42, of which the first and second outputs are connected to the first and second transmitting outputs of the antenna 35 respectively, the output and control input of transceiver 37 are connected to the second input and first control output of data collection device 38 respectively, the control input and output of antenna 35 are connected to the control output and input of antenna drive control device 40 respectively, of which the output is connected to the control input of data collection device 38, while the output of antenna positioning device 10 is connected with the third input of data collection device 38, and the control input of switching unit 42 is connected to the second control output of the data collection device 38.

In this case, scanning antenna 35 may be executed according to option 4 as provided in this application.

Any known options of arrangement of multi-channel radiometric receivers with frequency division of reception channels may be used as radiometric receiver 36 (see, for example, Patent (UA) 56347, 13 Apr. 2001, Multi-Beam Scanning Radiometer). In this case, the radiometric receiver may contain, for example, input microwave circuitry including a calibrator with the first and second receiver calibration elements, as well as a microwave amplifier, the first frequency converter, as well as power divider into M (M≥1) identical signals and M frequency channels of the second conversion to zero frequency with different frequencies of the second heterodynes in each channel, forming a spectrum of central frequencies of the reception channels. In this case, the microwave input of the microwave circuitry of such receiver will be the input of radiometric receiver 36, and M analog output lines respectively of M channels of the second frequency conversion, together with calibrator control lines, will form the output of radiometric receiver 36.

Any known single-channel or multi-channel transceiver device of radio locator with pulse-modulated signal may be used as transceiver 37. In case of a single-channel transceiver device used (K=1), it may be implemented according to the known scheme of the transceiver of a pulse radar station and may be comprised of (see FIG. 17*a*), Y circulator 43, of which the first input is the input of transceiver 37, receiver 44, of which the input is connected to the second input of circulator 43, and the output is the output of transceiver 37, as well as may include pulse transmitter module 45, of which the microwave output is connected to the third input of circulator 43, and of which the start input is the control input of transceiver 37. In this case, an additional carrier signal output of transmitter 45 is connected to an additional input of receiver 44.

In the event that a multi-channel transceiver device 37 is used (K>1), it may be implemented according to the above arrangement scheme for the single-channel transceiver option, however a multi-channel receiver with frequency division of channels is considered as receiver 44, for example, due to positioning at its input of an additional multiplexer with a single input and K outputs. In this case, the multiplexer input will be the input of receiver 44, the multiplexer outputs will be connected to K inputs of frequency channels, and frequency channel outputs will form a multi-channel output of receiver 44. Another option may include replacement of the multiplexer by a broadband power splitter with a single input and K outputs. In this case, multi-channel transmitter 45 of transceiver 37 will contain K transmitting modules operating with K independent emission frequencies, where microwave outputs of the modules will be connected to K outputs of the second additional multiplexer, of which the output will be connected to the third input of circulator 43. in this case, start outputs of all the transmitting modules of transmitter 45, connected together, will form a control input of transceiver 37, while an additional carrier signal output of each transmitting module of transmitter 45 will be connected to an additional input of the respective channel of receiver 44.

Any known transceiver device of radio locator with a continuously emitted frequency-modulated signal may be also used as transceiver 37 (see, for example, US2008/0129581, 11 Oct. 2005, System and Method for Standoff Detection of Human Carried Explosives), built based on the above scheme for a single-channel pulse transceiver, except to the extent that the transmitting module of the transmitter emits continuous frequency-modulated oscillation with the frequency modulation period $T_{em}$ under the effect of the signal supplied to the control input of transceiver 45, while at the additional output of the transmitting module of transmitter 45, a signal is formed with some constant frequency shift with respect to the emitted frequency.

Without prejudice to the generality of the foregoing, for the second and third system embodiment options, a scheme of transceiver 37 may be applied, without input circulator 43. In this case, the input of receiver 44 will serve as the input, and the microwave output of transmitting module 45 will serve as the microwave output, of transceiver 37.

Figure 17C:
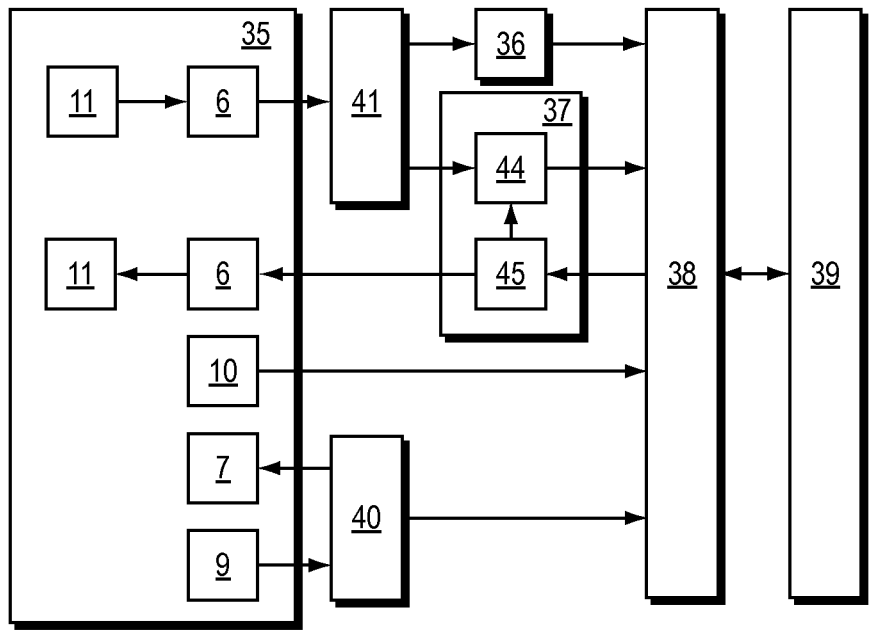
FIG. 17C shows another arrangement option of the millimeter and sub-millimeter wave radar-radiometric imaging system of the second example.
Figure 17D:
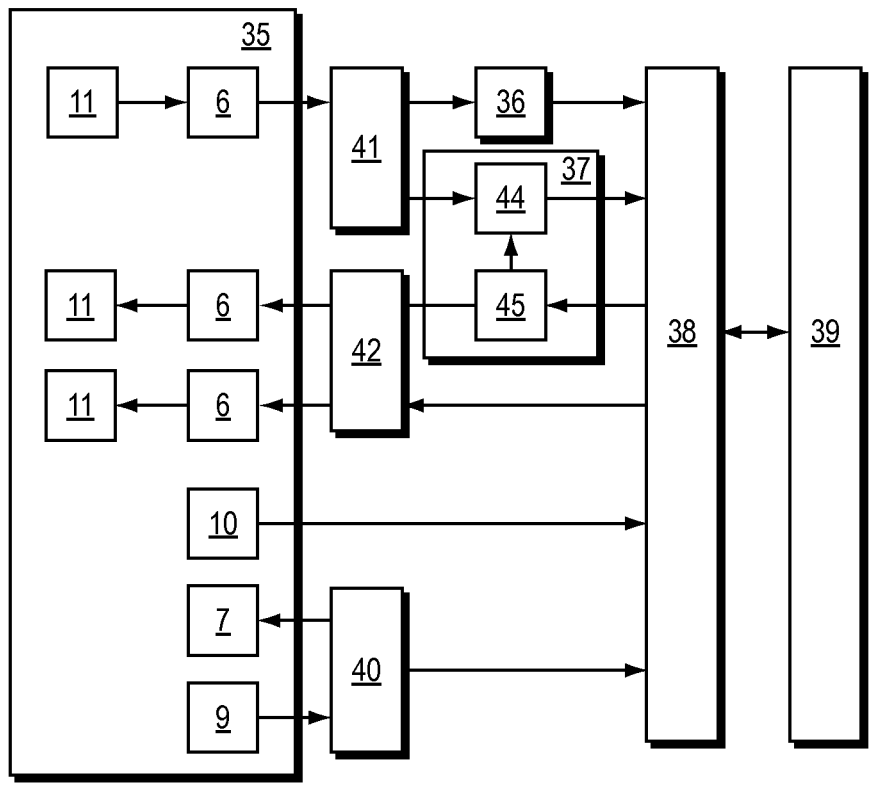
FIG. 17D shows an arrangement option of the millimeter and sub-millimeter wave radar-radiometric imaging system of the third example.

Without prejudice to the generality of the foregoing, for the second and third system embodiment options, a scheme of transceiver 37 may be applied, without input circulator 43, but with broadband noise signal generator 45 of the transmitter (see FIG. 17c). In this case, multi-channel receiver 44 of transceiver 37 will serve as the analog of radiometric receiver 36 with K frequency channels, and there will be no link between the additional output of transmitter 45 and additional input of receiver 44.

Any known microprocessor controlled multi-channel devices for analog-to-digital conversion of signals may be used as data collection device 38. For example, such device may contain a controlling microprocessor with standard RAM and command/data bus control devices, M and K controlled input channels of analog-to-digital conversion, as well as ensure at least 4 binary controlled output signals and at least two binary microprocessor interrupt control inputs, as well as two data input/output ports for information exchange with external devices on the basis of one of known exchange protocols, for example, based on the TCP/IP protocol. Functions of data collection device 38 also include digital data accumulation in RAM, performing operations with these data, for example, digital averaging of several successive counts obtained for each of M and K inputs, as well as ensuring controlled data transmission/reception by means of information exchange interfaces. The command sequence (operating program) of the data collection device may be either permanently located in its internal ROM device or transmitted from the outside subject to its initial initialization. For the considered structure of data acquisition device 38, M inputs of analog-to-digital converters and the first and second binary output signals jointly form the first input of data collection device 38, K inputs of analog-to-digital converters and the third binary output signal are the second input and the first control output of data collection device 38 respectively, the first and second TCP/IP based information exchange ports are the output and the third input of data collection device 38 respectively, the fourth binary output signal is the second control output of data collection device 38, while the first and second microprocessor interrupt inputs act as its control input.

Imaging device 39 may be implemented on the basis of a personal computer and is comprised, for example, of a computer system unit with standard input/output devices and imaging display. In this case, TCP/IP based information exchange port of the personal computer will serve as the input of imaging device 39.

In terms of its functional purpose, antenna drive control device 40 is a programmable digital machine and is designed for controlling electromechanical drive 7 of antenna 35. In implementing electromechanical drive 7, for example, on the basis of a stepped motor, antenna drive control device 40 should ensure formation of pulse control signals of required composition for each of power phases of the motor. In doing so, it may be implemented on the basis of a microprocessor, for example, single-chip microprocessor MCS-96. As such microprocessors ensure the possibility of independent control of each of the positions (lines) of the parallel port, then, for example, the first, second, third and fourth lines of the parallel port of the microprocessor will form a control output (for example, for controlling the four-phased stepped motor of electromechanical drive 7), the fifth and sixth lines of the parallel port serve as the output, and the external microprocessor interrupt input serves as the control input of antenna drive control device 40.

Any type of frequency division device may be used as diplexer 41, ensuring division of the operating frequency band into two more narrowband frequency channels with mutual depression of signals with frequencies of one bandwidth within a channel with another bandwidth. For example, diplexer 41 may be executed on the basis of a waveguide T bridge with one input and two output legs, in which case the output legs are furnished with sets of high and low frequency waveguide filters of required order, ensuring gating and depression of signals within different pass and barrier frequency bands. In this case, the first leg of the T bridge with the overall bandwidth will serve as the input of diplexer 41, while the other two legs of the T bridge will serve as the first and second outputs of diplexer 41.

Any controlled high-frequency device with one input and two outputs may be used as switching unit 42, ensuring connection of its first or second output to the input under control of binary control signal. For example, the known p-i-n diode based waveguide controlled switch may be used as switching unit 42. The input and two outputs of such switch serve respectively as the input, first and second outputs of switching unit 42, while the input of the p-i-n switch control binary signal serves as the control input of switching unit 42.

Figure 9:
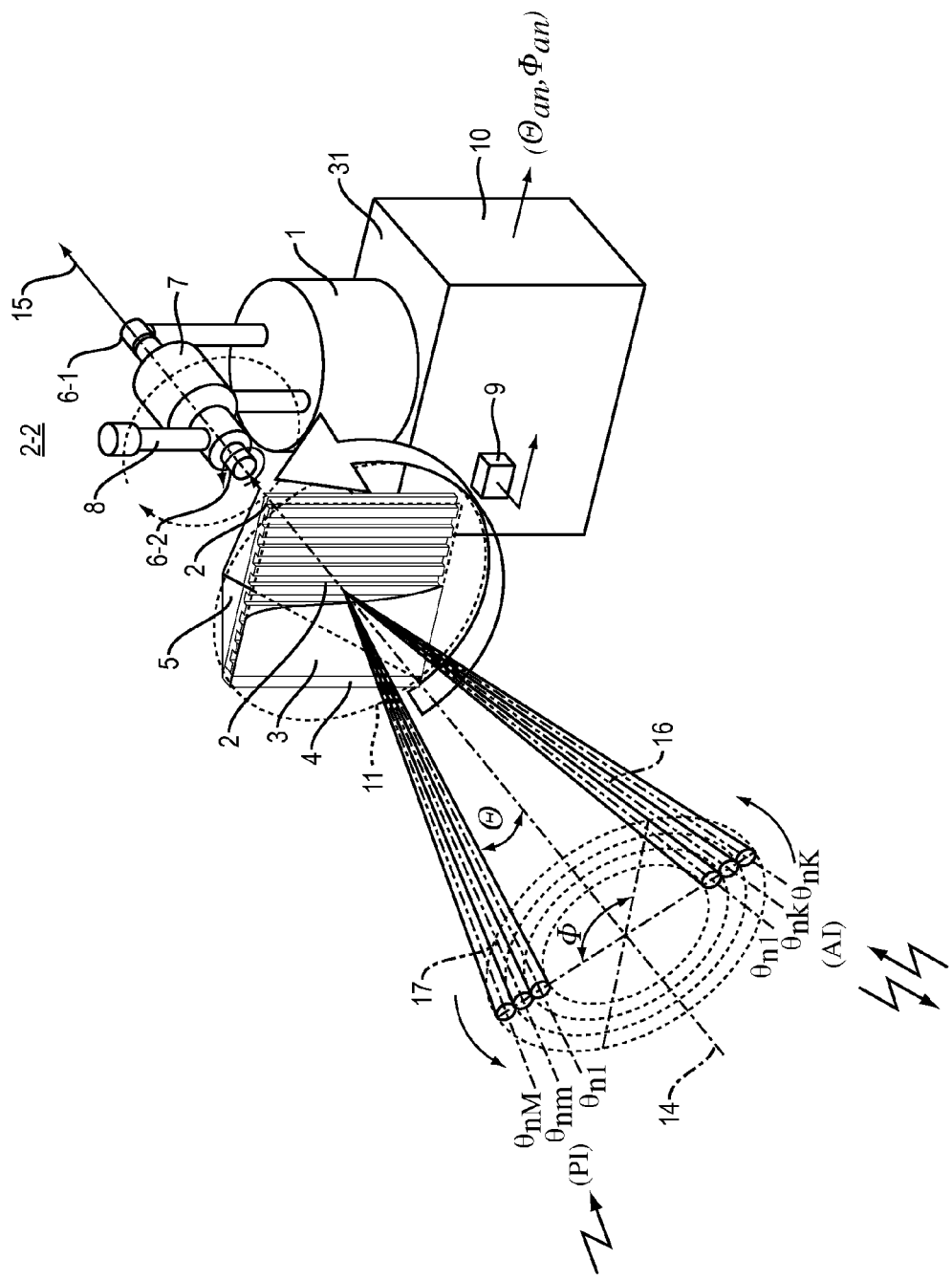
FIG. 9 shows a scanning antenna diagram for the first and second examples of the present invention.

The antenna according embodiment options 1 and 2 will operate as follows (see FIG. 4, FIG. 9). The shaft of electromechanical drive 7 will rotate with a constant angular speed, for example, ~10 rps with the rotation period $T_a$=100 ms, resulting in antenna rotor 11, connected with the shaft, rotating with the same speed. External radio-thermal radiation falls at different angles on the antenna aperture plane determined by the external surface of planar dielectric waveguide 3, passes through planar dielectric waveguide 3 and is scattered by diffraction grating 2. Parameters of the open electrodynamic structure formed by dielectric waveguide 3 and diffraction grating 2 are selected so that within the frequency bands (PI)$\Delta f_m$ external emissions/radiation supplied at each time point from a certain spatial angle with the spatial orientation of individual beams (PI)($\theta_{mn}$, $\phi_{mn}$), connected with the respective frequency band (PI)$\Delta f_m$, is transformed into a surface wave of dielectric waveguide 3, channeled thereby and via linear waveguide turn 4, feed-adapter 5 and rotating waveguide adapter 6 is supplied to the output flange of the antenna. The said spatial angle at each time point is determined by the spatial position of the sector of angles counted from the normal line to the antenna aperture plane and spatially linked with the local coordinate system oriented within the aperture plane and defining its spatial position. In this case, one axis ($\vec{z}$) of the coordinate system is located perpendicular to the antenna aperture plane, the second axis ($\vec{x}$) lies in the aperture plane and determines the propagation direction of the received electromagnetic wave in planar dielectric waveguide 7, while the third axis ($\vec{y}$) is orthogonal to the mentioned two axes and determines the orientation of scattering elements (combs) of diffraction grating 2.

The external, with respect to the antenna, receiving device provides segregation of M frequency bands $\Delta f_m$ of the received emission. Due to the pronounced dispersion properties of the mentioned open electrodynamic system of the antenna, in each of M obtained frequency bands $\Delta f_m$ the fallen emission is transformed with different efficiency. As a result, at each time point, along the angular coordinate $\Theta$ counted from axis $\vec{z}$ in the plane (X0Z), antenna forms M-beam directional diagram 17 with M most efficient reception directions (PI)($\theta_{mn}$, $\phi_{mn}$) determining the spatial positions of axes for M beams of the directional diagram of the antenna. In this case, each of the directions $\theta_m$ is uniquely linked with the respective frequency band $\Delta f_m$, and the beam width is linked with the size of the receiving aperture along the coordinate x and frequency bandwidth $\Delta f_m$, for example, all beams within the group have the same width $\Delta\theta=0.5°$. As the dispersion properties of the antenna electrodynamic system are only displayed in one direction linked with reference axis $\Theta$, along the second angular coordinate $\Phi$ counted from axis $\vec{z}$ in the plane (Y0Z), all the beams 17-$m$ have the same coordinate $\phi=0$ and width $\Delta\phi$, determined by the lateral dimension of diffraction grating 2 according to the respective spatial coordinate Y. In this way, $\Delta\phi$ is the same for all the beams and is, for example, equal to $\Delta\phi=0.5°$.

As a result of rotation of the antenna rotor, M-beam directional diagram 17 also synchronously rotates, in which case each of the beams 17-$m$ moves along its conic generatrix depending on the deviation $\theta_m$ of the specific beam 17-$m$ from the selected main direction of survey $\Theta_a$ within the value plane $\Theta$. In the course of rotation of the M-beam directional diagram, during a single revolution the antenna views the conic segment of spatial angles having main axis of rotation 14 as a spatial axis.

The similar electrodynamic transformations in the antenna are made when operated in the transmission mode. If frequency bands coincide for reception and transmission, spatial directions of beams also coincide. In the event of different frequency bands of the antenna for transmission and reception (AI)$\Delta f_k$, and (PI)$\Delta f_m$, two beams groups are respectively formed therein (AI)($\theta_{kn}$,$\phi_{kn}$) and (PI)($\theta_{mn}$, $\phi_{mn}$), subsequently used in forming radar and radiometric images respectively. In this case, the number of independent beams in the groups may not coincide and will be only determined by the number of used frequency bands K и M for the selected angular frequency factor of the antenna.

In the course of the circular scanning, the angular momentum of inertia of the antenna rotor is completely compensated due to rotation of angular momentum compensator 8 in the opposite direction and with the required speed. In this case, the spatial orientation of the antenna sector of viewing angles may be changed, without any significant efforts, by changing the spatial orientation of the landing plane of bearing device 1 using positioning device 10.

Independent angular positions of antenna rotor 11 in time are rigidly linked with the structure of signals formed by position sensor 9 and positioning device 10. As a result, at the time interval T within the external imaging device in relation to the antenna, when using data ($\Theta_{an}$,$\Phi_{an}$) of current positions of the mounting plane of positioning device 10 and current position of antenna rotor 11 in relation to its initial position fixed by means of position sensor 9, linkage of data counts is ensured, (AI)$t_{nk}$ and (PI)$t_{nm}$ respectively, to current spatial positions of the K-beam and M-beam groups of the antenna respectively.

After each complete revolution made by the antenna rotor, position sensor 9 issues a feature signal which is used in external devices for separation of data corresponding to individual revolutions of the antenna. When a new cycle T starts within the positioning device, the antenna operating cycle is repeated.

According to embodiment option 3, the antenna operates using two sections, receiving and transmitting sections respectively, while the antenna itself has two outputs 15-1 and 15-2 respectively. In this case, each of the sections has rotor 11 rotating with the help of common electromechanical drive 7, while the angular momentum of each rotor 11 is compensated using independent angular momentum compensator 8. In this regard, rotation axes 14-1 and 14-2 of rotors 11 are collinear in space, and rotation of these rotors is carried out synchronously with the same speed. In doing so, rotor 11 of the receiving section of the antenna is only used for receiving external radiation, and rotor 11 of the transmitting section of the antenna is only used for additional irradiation of the space suing an external, with respect to the antenna, emission source.

In this case, operation of the receiving section of the antenna is completely correspondent to the antenna operation according options 1 and 2 described above. Operation of the transmitting section depends on whether rotor 11 of the transmitting section of the antenna is completely identical to rotor 11 of the receiving section. In the event that they are identical and operate within the same frequency bands, then in the course of operation, the receiving and transmitting sections of the antenna create similar multi-beam directional diagrams, of which the cognominal beams separate at each time point the same spatial elements within the antenna sector of viewing angles. As a result, radar and radiometric imaging is carried out using similar but distanced antennas, which increases the isolation and decreases the mutual influence of the received radar and radiometric signals.

Operation of the antenna according to option 3 with rotor 11 of the transmitting section of the antenna, containing only feed-adapter 5 in the form of weakly directional horn antenna, is not different from the options considered above, except to the extent that the space is illuminated for the entire survey area of the receiving section of the antenna subject to agreed spatial orientation of the polarization vectors of the emitted and received signals.

According to embodiment option 4, the antenna operates in the same manner as according to option 3, except to the extent that the space is illuminated alternately by signals based on coherent/coincided and cross polarization, in which case during a single rotation period the antenna views the same spatial angle with alternative reception by the receiving section of the antenna of signals based on coincident and cross polarizations.

The radar-radiometric imaging system according to the first embodiment option operates as follows (see FIG. 17a, FIG. 9). External emission received by antenna 35 within the antenna operating frequency band $\Delta f$ via antenna output 15 is supplied to diplexer 40, where it is divided into two summarized frequency channels with two different bandwidths, of which the first is formed by the frequency bands $(PI)\Delta f_m$, while the second—by the frequency bands $(AI)\Delta f_k$, used for radiometric and radar imaging respectively. Microwave signals within the band $(PI)\Delta f_m$ coming to the first output of diplexer 40 are supplied to the input of radiometric receiver 36, where they are amplified, divided in M frequency channels into M independent frequency bands $\Delta f_m$, then they are detected, integrated and amplified in M low-frequency channels of the receiver, operating according to the full-power radiometric receiver scheme. M analog signals received at the output of the radiometric receiver are supplied to the first input of data collection device 38. As antenna forms a separate narrow beam within each of the bands $\Delta f_m$, then M analog signals obtained at the output of radiometric receiver 36 will correspond by their amplitude to the emission intensity of M independent space elements.

For the purpose of subsequent bringing of M radiometric signals to a common intensity scale, independently of the current value of the amplification factor in each of M channels, the input of radiometric receiver 36 is periodically connected to two internal calibration broadband radio-thermal radiation sources with different and known intensity levels. Such procedure may be, for example, carried out once per imaging cycle with the duration T for example, prior to its beginning. In this case, binary control signals are successively supplied via calibrator control lines from data collection device 39 to receiver 36 at the time interval corresponding, for example, to one full revolution of antenna 35. Based on their changed combination, the input of receiver 36 is successively disconnected from the first output of diplexer 41 and connected to the output of the first and then to the output of the second internal radio-thermal radiation source. Following the completion of the calibration cycle, the input of receiver 36 will be repeatedly connected to the first input of diplexer 41.

Microwave signals within the band $(AI)\Delta f_k$, segregated at the second output of diplexer 40, are supplied to the input of transceiver 37 and via circulator 43 are supplied to the input of radar receiver 44, where they are amplified, divided into K frequency bands $\Delta f_k$, detected, integrated and amplified in K channels of radar receiver 44. K analog signals obtained at the output of the radar receiver are supplied to the second input of data collection device 38.

Under the influence of a periodic control signal generated by data collection device 38 at its first control input, transmitting module 45 of transceiver 37 generates K microwave pulse signals with K independent frequencies. Via diplexer 41 and circulator 43, these signals are supplied to the output of antenna 15 and are emitted to the space. As in each of the bands $\Delta f_k$, the antenna forms a separate narrow beam, then the emitted signals expose K different space elements and respectively signals reflected within the bands $\Delta f_k$ are also received from K different space elements, while K analog signals obtained at the output of transceiver 37 will correspond to the intensity of the back scattering of K independent space elements.

In addition, copies of K signals emitted by transmitting module 45, reduced by amplitude, or microwave signals created on their basis in transmitting module 45 are supplied via K additional outputs of transmitting module 45 to K additional inputs of radar receiver 44 and used for processing the received radar signals, for example, in the course of frequency conversions or to adjust the frequency of internal heterodynes of receiver 44.

Under the influence of a signal generated at the control output of antenna drive control device 40, motors of drive 7 are continuously rotating with a constant speed, in which case the shaft of electromechanical drive 7 is also rotating with a constant speed, for example, ~10 rps with the rotation period $T_a=100$ ms, resulting in antenna rotor 11, connected with the shaft, rotating with the same speed. Based on the selected clock switch frequency of windings of the stepped motor of drive 7, generated by the microprocessor of antenna drive control device 7, it also forms a sequence of pulses with the period $\Delta t$, corresponding to the time of transition of the antenna beams from one independent state to another in the course of rotation of rotor 11. Via the control output of drive 7 control device, these pulses are supplied to the first input of interrupt of the microprocessor in data collection device 38 and cyclically launch the performance of this interrupt processing program, as a result of which in M+K channels of analog-to-digital conversion of data collection device 38, conversion is made for M analog signals received at the first input and for K analog signals received at the second input of this device. As a result, for each of the independent positions of the antenna beams $(AI)\theta_k$ and $(PI)\theta_m$, M and K independent digital codes appear fixed respectively in RAM of the data collection device, corresponding to the intensity of natural radio-thermal radiation and scattered radar radiation respectively, as received by the antenna at specific time points. These time points are counted in the microprocessor of the data collection device from the time of receiving a second interrupt signal at its control input, from antenna drive control device 40. This signal is generated with the periodicity $T_a$ when a pulse signal is received at the control input of antenna drive control device 40, from antenna initial position sensor 9, and corresponds to passing by antenna rotor 11 of its initial position, in relation to bearing device 1 of the antenna, in the course of rotation of rotor 11 around the axis of electromechanical drive 7.

Therefore, during a single complete revolution of antenna rotor 11, the microprocessor RAM of data collection device 38 accumulates an array from $(T_a/\Delta t)\cdot(M+K)$ binary values corresponding to the signal levels received during one revolution of antenna 35.

Independently of the analog-to-digital signal conversion process, data of current coordinate values for angular orientation of the antenna axis of rotation $(\Theta_{an},\Phi_{an})$ are periodically transmitted to data collection device 38 from antenna positioning device 10. In this case, the transmission frequency of these values to data collection device 38 may, for example, correspond to the antenna rotation frequency, and the request for transmission of a successive coordinate value $(\Theta_{an},\Phi_{an})$ may be originated by data collection device 38. Therefore, during the cycle T, positioning device 10 of antenna 35 performs the full motion cycle, as a result of which rotation axis 14 of antenna 35 comes back to its initial position. During this entire cycle, N independent coordinate values $(\Theta_{an}, \Phi_{an})$ are supplied to the data collection device 38.

In this way, during one full operating cycle of the radar-radiometric imaging system, memory of data collection device 38 in digital form successively accumulates data corresponding to $N \cdot (T_d/\Delta t) \cdot M$ independent positions of the antenna beams in receiving radiometric signals and $N \cdot (T_d/\Delta t) \cdot K$ independent positions of the antenna beams in receiving radar signals for N independent spatial positions $(\Theta_{an}, \Phi_{an})$ of antenna axis 14, as well as additionally $(T_d/\Delta t) \cdot M$ calibration counts for M channels of radiometric receiver 36. Based on the calibration counts obtained at the beginning of the cycle, in the course of calculations, the radiometric values are brought to a common scale brightness temperatures, for example, on the basis of the known linear procedure of transformation for two-point calibration scheme, thereby eliminating any differences in transmission factors of M channels of radiometric receiver 36.

As they are received during the space survey cycle T or following its completion, the accumulated data are supplied via a bidirectional data communication line from data collection device 38 to imaging device 39.

In imaging device 39, in case of cyclic execution of the computation program, for each of $N \cdot (T_d/\Delta t) \cdot M$ independent positions of the antenna beams in receiving radiometric signals and $N \cdot (T_d/\Delta t) \cdot K$ independent positions of the antenna beams in receiving radar signals, based on trigonometric ratios, spatial coordinates of respective image elements are calculated, as well as the degree of the proximity of the coordinates of each of the obtained digital counts to the coordinates of the uniform spatial net with the selected coordinate increment in the image plane—$\Delta x$, $\Delta y$, is analyzed. In this case, each of the counts is assigned coordinates of the nearest node of the coordinate grid, and then separately for radar data and separately for radiometric data, averaging is made for the values obtained for each of the nodes of this coordinate grid. Therefore, as a result of the performance of the computation program in visualization device 39, for the time interval T arrays of spatial counts appear completed for radar and radiometric images, of which the spatial coordinates are adapted to the selected scale grid of images in plane, and of which the averaged values correspond to the levels of received signals. At the next calculation stage, in imaging device 39, these levels are transformed to a brightness or color scale when using linear or non-linear procedures for transformation of count values into brightness of image elements. Following the completion of this procedure, the formed data arrays, independently for radar and for radiometric image, are represented on a display of imaging device 39 and/or are saved in the form of image file sequences on electronic or magnetic data registration devices.

This means the completion of the operating cycle of the radar and radiometric imaging system, and the system proceeds to performance of the next cycle.

Without prejudice to the generality of the forgoing, operation of the radar and radiometric imaging system according to the first embodiment option may be supplemented with additional calculation procedures. For example, as an additional procedure, based on simultaneously obtained radar and radiometric images, a combined image may be built, of which the brightness of elements will be determined according to some decision rule. As another additional procedure, a radar data processing algorithm may be considered, according to which the values of distance from antenna 35 to the observed surface element in the radar image are additionally calculated. Such calculations will be possible, for example, based on data of delay of the momentum of analog-to-digital conversion for radar signals, in relation to the momentum of generation of a microwave pulse by transmitting module 45. In order to fix this momentum, analog-to-digital conversion for K radar signals may be arranged with a significantly higher frequency as compared with radiometric signals, in which case the number of radar counts received at the time interval $\Delta t$ will be increased by respective number of times. As a result, radar images in imaging device 39 may be formed in the 3D coordinate basis, where a separate image may be formed for each selected distance on the distance scale.

Without prejudice to the generality of the foregoing, operation of the radar and radiometric imaging system according to the first embodiment option may be considered subject to operation of transceiver 37 in the frequency-modulated signal generation and processing mode. In this case transceiver 37 emits a continuous oscillation and due to variation of its carrier frequency a beam of antenna 35 scans along the radius of the conic surface made by the antenna beam in space. As in this case, during the interval $\Delta t$ the antenna beam takes K independent positions, then in case of the respective increase of the analog-to-digital conversion frequency for radar signal at the second input of data collection device 38, during the interval $\Delta t$ independent K counts will be obtained for the radar signal for K independent positions of the beam $(AI)\theta_k$. As for the rest, operation of the radar and radiometric imaging system according to this embodiment option will correspond to the option with K simultaneously emitted signals, as described above.

Without prejudice to the generality of the foregoing, operation of the radar and radiometric imaging system according to the first embodiment option may be extended to the second embodiment option, where microwave signals generated by transceiver 37 in the pulse or frequency-modulated mode are emitted or radiated into space using an additional weakly directional rotating antenna, to the output of which the microwave output of transceiver 45 is connected. As the spatial orientation of polarization vectors of both antennas at each time point is the same, all the peculiarities of the system operation considered above will remain unchanged, except to the extent that the spatial selection of radar signals will be only made for reception.

Without prejudice to the generality of the foregoing, operation of the radar and radiometric imaging system according to the second embodiment option may be considered with operation of transceiver 37 in the mode of generation of broadband noise signal with a summarized frequency band $(AI)\Delta f_k$. The main difference of this option is the impossibility of obtaining information on the distance for radar signals without additional correlation processing activities carried out. At the same time, simultaneous obtaining of data on the intensity of the own radio-thermal radiation and back scattering of signals with the same noise structure for the same space elements will allow detecting additional information attributes and eliminate non-uniqueness in data interpretation.

Without prejudice to the generality of the foregoing, operation of the radar and radiometric imaging system according to the second embodiment option may be extended to the third embodiment option, where microwave signal generated by transceiver 37 will be alternatively supplied, using switching unit 42, to the inputs of two weakly directional transmitting antennas installed subject to the mutually orthogonal spatial orientation of the polarization vector. In this case, in the event of connection of transceiver 37 to the transmitting antenna with a coincident, in relation to the receiving antenna, location of the polarization vector, values of radar signals will be obtained and images will be formed for the coincident polarization component of the electromagnetic field, and in the event of connection of transceiver 37 to the transmitting antenna with the orthogonal, in relation to the receiving antenna, position of the polarization vector, values of radar signals will be obtained and images will be formed for the cross polarization component of electromagnetic field. Owing to the synchronization of the control signal of switching unit 42 with the radar data addressing process in data collection device 38, the said counts will be divided according to the criterion of their correspondence to the coincident or orthogonal polarization orientation, as a result of which imaging device 39 will form two independent images for two different polarization components of the radar signal.

What is claimed is:

1. An imaging system comprising:
    at least one antenna rotor configured to rotate about an axis of rotation, the antenna rotor comprising:
        a two-dimensional diffraction grating;
        a planar dielectric waveguide;
        a waveguide turn; and
        a rotating waveguide adapter to provide an input/output;
        wherein the diffraction grating and the dielectric waveguide are arranged to at least one of transform external radiation coupled to the dielectric waveguide to surface waves at the dielectric waveguide and transform surface waves at the dielectric waveguide to external radiation; and
        wherein the waveguide turn is arranged to assist guiding of electromagnetic waves between the dielectric waveguide and the rotating waveguide adapter;
    a transceiver operatively connected to at least one antenna rotor to enable active imaging; and
    a receiver operatively connected to at least one antenna rotor to enable passive imaging.

2. The imaging system according to claim 1, wherein the antenna rotor further comprises a plurality of antenna elements and a phasing unit, wherein each antenna element comprises a planar dielectric waveguide, a waveguide turn and a feed adapter which provides an output to the phasing unit, and wherein the phasing unit is configured to provide an input to the rotating waveguide adapter.

3. The imaging system according to claim 2, wherein the diffraction grating of the antenna rotor is common to each of the plurality of antenna elements.

4. The imaging system according to claim 3, wherein each of the plurality of antenna elements have a unit planar dielectric waveguide divided into as many sections as there are antenna elements due to conductive wires in dielectric material, ensuring complete reflection of electromagnetic waves inside the dielectric material, in which case the wires join pointwise work surfaces of the planar dielectric waveguide with each other along the required boundary lines, and the distance between the wires is much less than the wavelength in the planar dielectric waveguide within the operating frequency band of the antenna rotor $\Delta f$, while the wires are electrically connected with each other on the work surface of the dielectric waveguide, forming circuits with the same electrical potential.

5. The imaging system according to claim 4, wherein the wires are made using the method of metallization of openings in the dielectric waveguide and connected with each other by means of printed metal conductors applied to work surfaces of the planar dielectric waveguide along boundary lines between sections.

6. The imaging system according to claim 4, wherein the wires are made due to producing a seam using the method of continuous weaving of the planar dielectric waveguide with a metal wire.

7. The imaging system according to claim 1, further comprising a bearing device comprising an angular momentum compensator.

8. The imaging system according to claim 1, wherein the feed adapter is a waveguide transition from a hollow waveguide to the waveguide turn which is configured to form an appropriate field distribution at the waveguide turn.

9. The imaging system according to claim 1, wherein the conjugation point of the planar dielectric waveguide and the waveguide turn is furnished with a matching bell mouth.

10. The imaging system according to claim 9, wherein the side faces of the bell mouth have a flat form and the bell mouth cross section in the direction of the axial coordinate changes linearly.

11. The imaging system according to claim 9, wherein the side faces of the bell mouth have the concave form and the bell mouth cross section in the direction of the axial coordinate changes non-linearly.

12. The imaging system according to claim 9, wherein the planar dielectric waveguide has a tapered section provided by a linear or non-linear variation in thickness.

13. The imaging system according to claim 1, in which the planar dielectric waveguide, waveguide turn and feed adapter are structurally designed as a single element of dielectric material, with a continuous conductive layer in the form of thin metal film applied to the respective part of this element out of the surface of the dielectric waveguide.

14. The imaging system according to claim 2, wherein the phasing unit has a low-noise amplifier at each of a plurality of inputs corresponding to the plurality of antenna elements, with the operating frequency band $\Delta f$ of the antenna rotor.

15. The imaging system according to claim 1, wherein a feed adapter implemented is based on a broadband horn antenna.

16. The imaging system according to claim 1, wherein the transceiver and receiver are both operatively connected to one antenna rotor.

17. The imaging system according to claim 16, comprising a diplexer operatively connected to the output/input of the one antenna rotor, to the transceiver, and to the receiver.

18. The imaging system according to claim 1, wherein:
    the transceiver is operatively connected to a first antenna rotor to receive and is operatively connected to a second antenna rotor to transmit; and
    the receiver is operatively connected to the first antenna rotor.

19. The imaging system according to claim 1, wherein
    the transceiver is operatively connected to a particular antenna rotor to receive and is operatively connected to another type of antenna to transmit; and
    the receiver is operatively connected to the particular antenna rotor.

20. The imaging system according to claim 19, wherein the other type of antenna comprises a horn antenna.

21. The imaging system according to claim 1, comprising two or more antenna rotors configured to rotate at the same speed.

22. The imaging system according to claim 1, wherein the transceiver is operatively connected to a first antenna rotor to transmit first radiation, to a second antenna rotor to transmit second radiation, and to a third antenna rotor to receive third radiation, the first and third radiation having substantially parallel polarization and the second and third radiation having substantially orthogonal polarization.

* * * * *